United States Patent [19]
Koyama

[11] Patent Number: 6,072,936
[45] Date of Patent: Jun. 6, 2000

[54] PICTURE SYNTHESIZING APPARATUS AND RECORDING MEDIUM

[75] Inventor: Noboru Koyama, Kanagawa, Japan

[73] Assignee: Sony Corporation, Tokyo, Japan

[21] Appl. No.: 08/862,060

[22] Filed: May 22, 1997

[30] Foreign Application Priority Data

May 23, 1996 [JP] Japan .................................. 8-128586

[51] Int. Cl.$^7$ ...................................................... H04N 5/91
[52] U.S. Cl. .............................................. 386/95; 386/69
[58] Field of Search .................................. 386/45, 69, 70, 386/124, 125, 95; 360/48, 72.1, 72.2; 369/48, 54; 348/231, 232, 384, 390, 233

[56] References Cited

U.S. PATENT DOCUMENTS

| | | | |
|---|---|---|---|
| 5,164,831 | 11/1992 | Kuchta et al. | 348/233 |
| 5,440,401 | 8/1995 | Parulski et al. | 386/124 |
| 5,768,536 | 6/1998 | Strongin et al. | 348/384 |
| 5,806,072 | 9/1998 | Kuba et al. | 348/231 |

*Primary Examiner*—Wendy Garber
*Assistant Examiner*—Christopher Onuaku
*Attorney, Agent, or Firm*—Frommer Lawrence & Haug, LLP.; William S. Frommer

[57] ABSTRACT

An apparatus for synthesizing source pictures stored in a recording medium, includes a first reproducer for reproducing a video data from a first recording medium in which the video data is recorded in accordance with a data recording format having a hierarchical structure. The video data comprises at least a high resolution video data and a corresponding low resolution video data. A second reproducer is also provided for reproducing a texture image data and a key data for keying the reproduced video data from a second recording medium in which the texture image data and the key data are recorded in accordance with the same recording format as the data recording format. The texture image data comprises at least a high resolution texture image data and an associated low resolution texture image data. The key data comprises at least a high resolution key data and an associated low resolution key data. A synthesizer for synthesizing the high resolution video data and the high resolution texture image data based on the high resolution key data and for synthesizing the low resolution video data and the low resolution texture image data based on the low resolution key data.

19 Claims, 24 Drawing Sheets

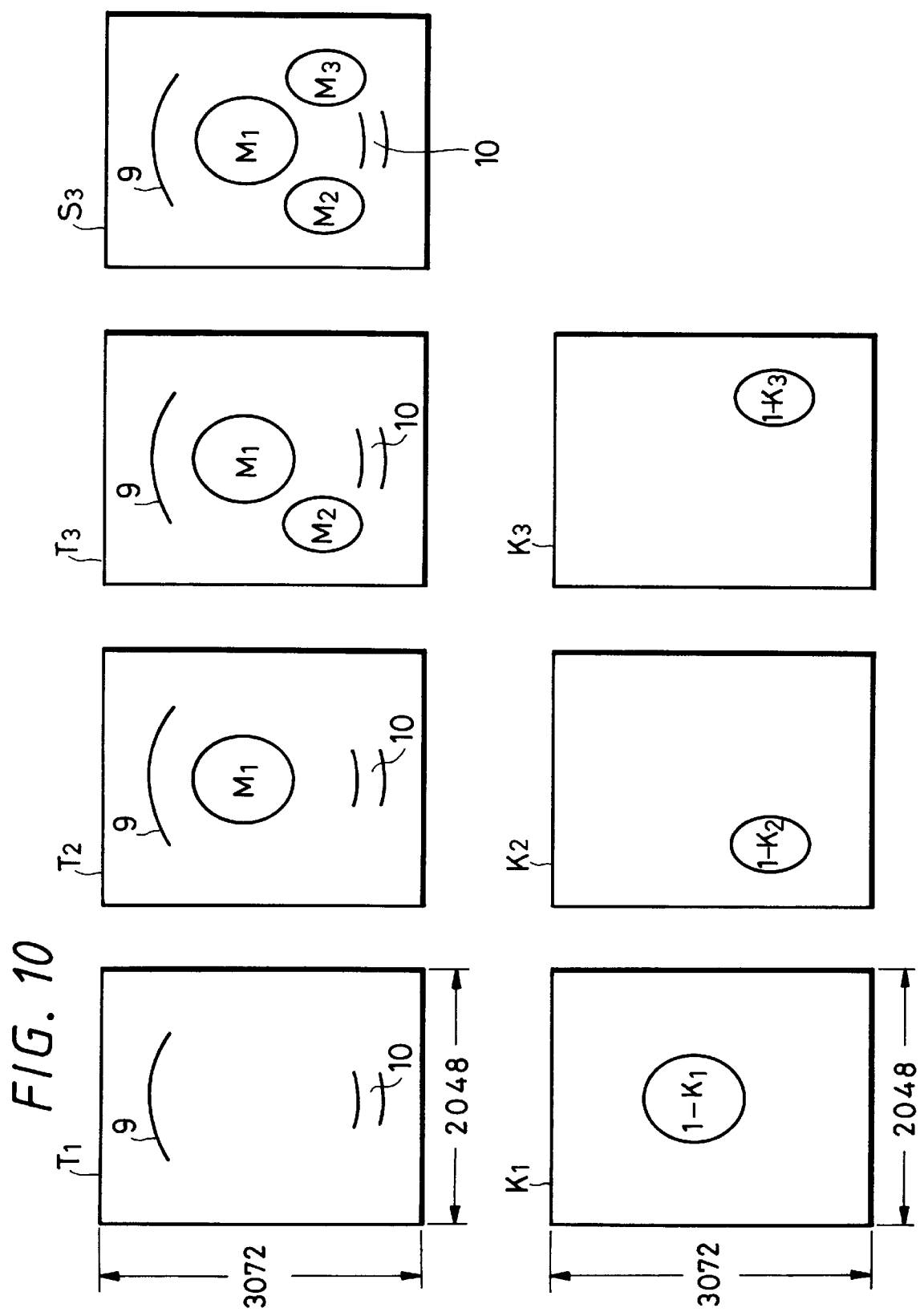

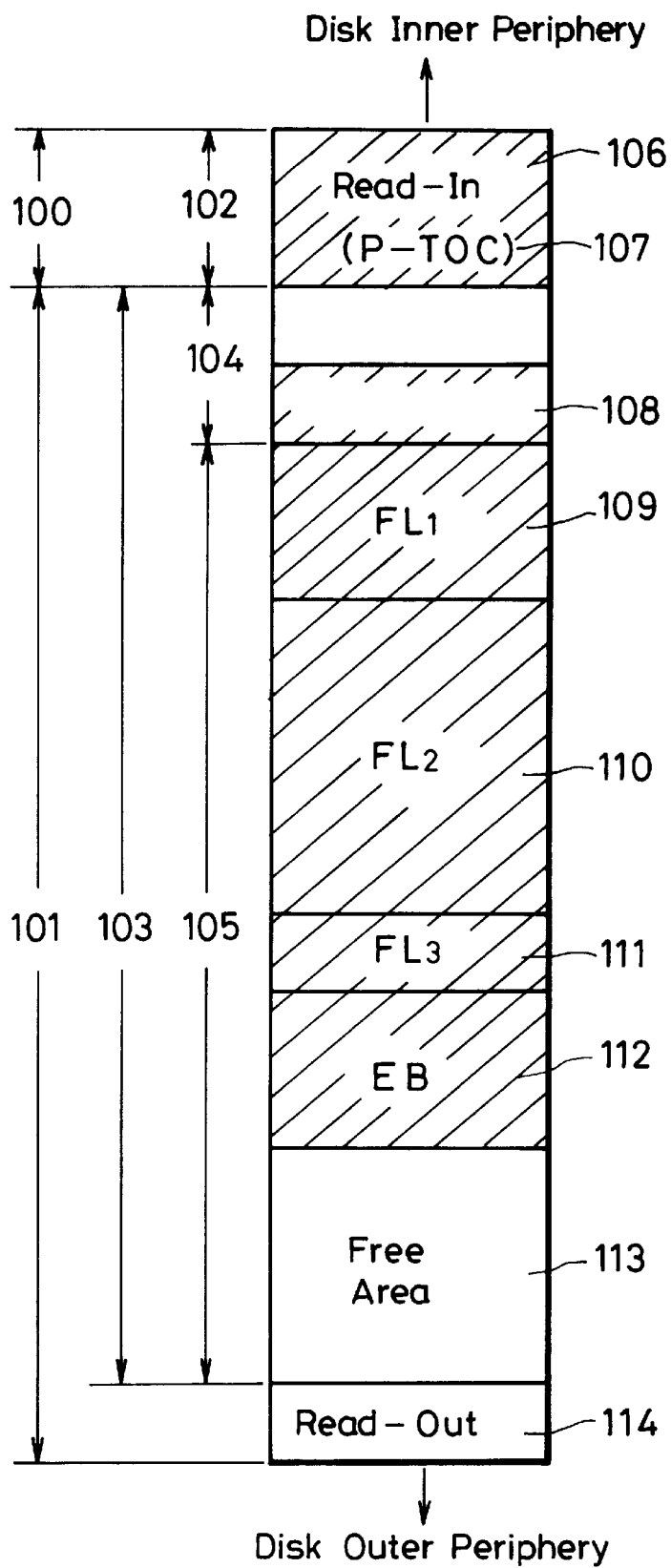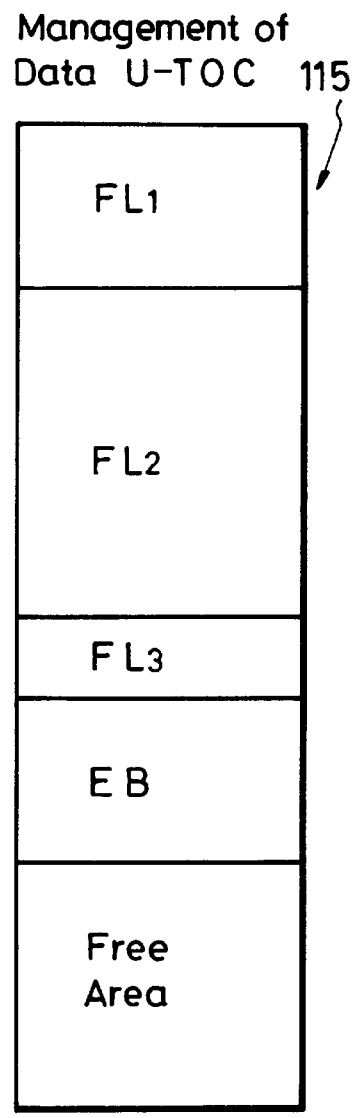

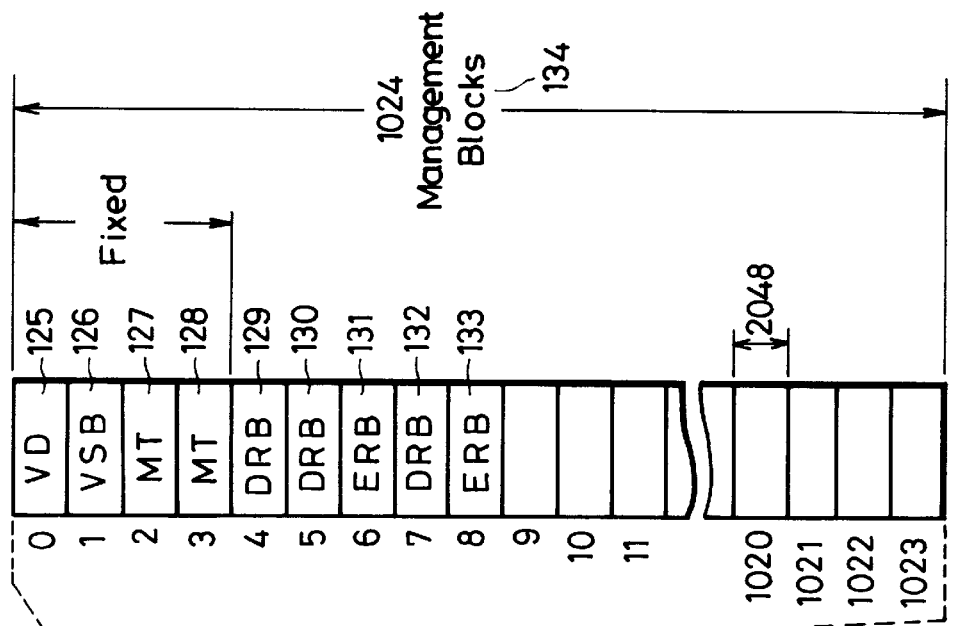
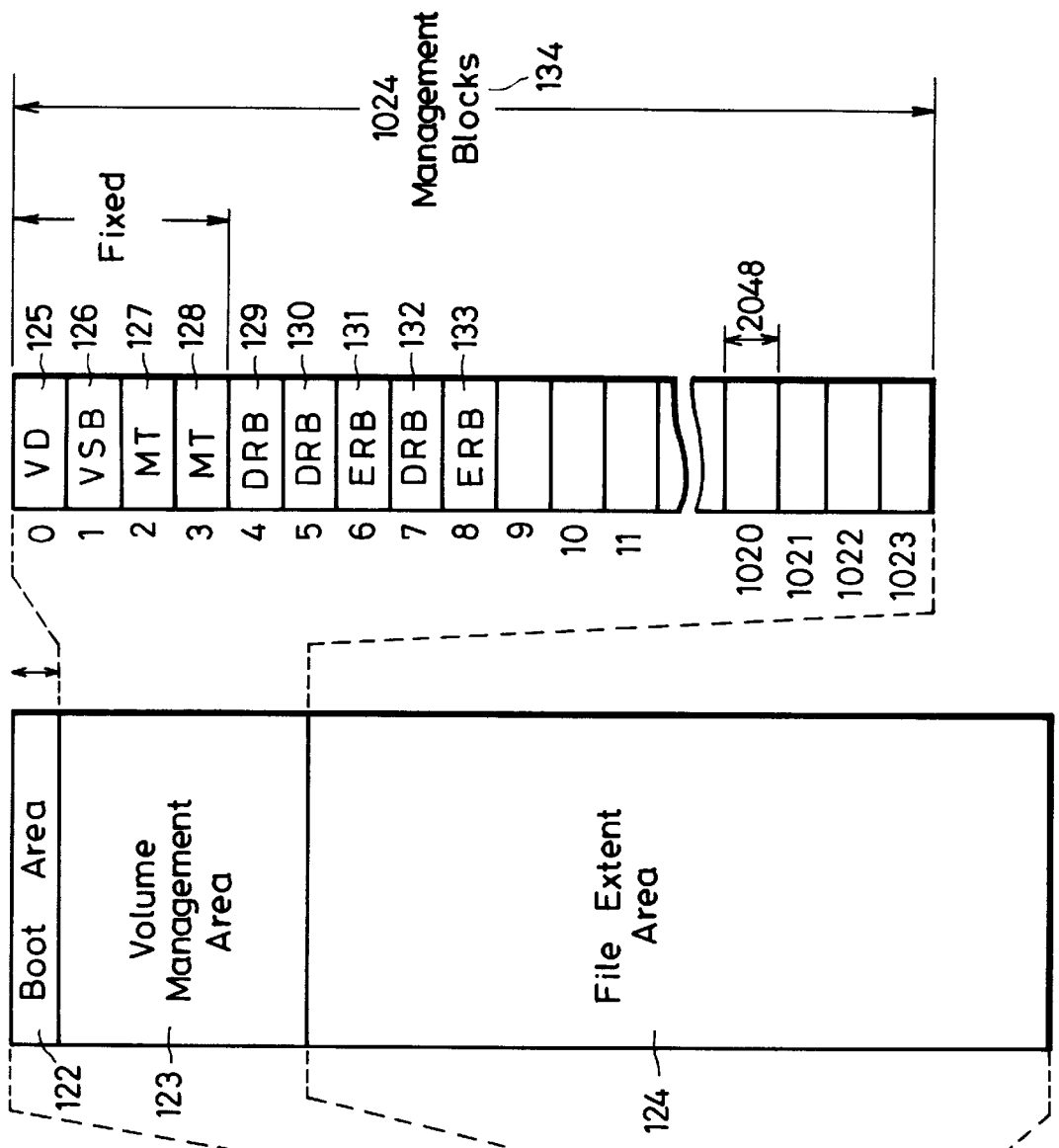
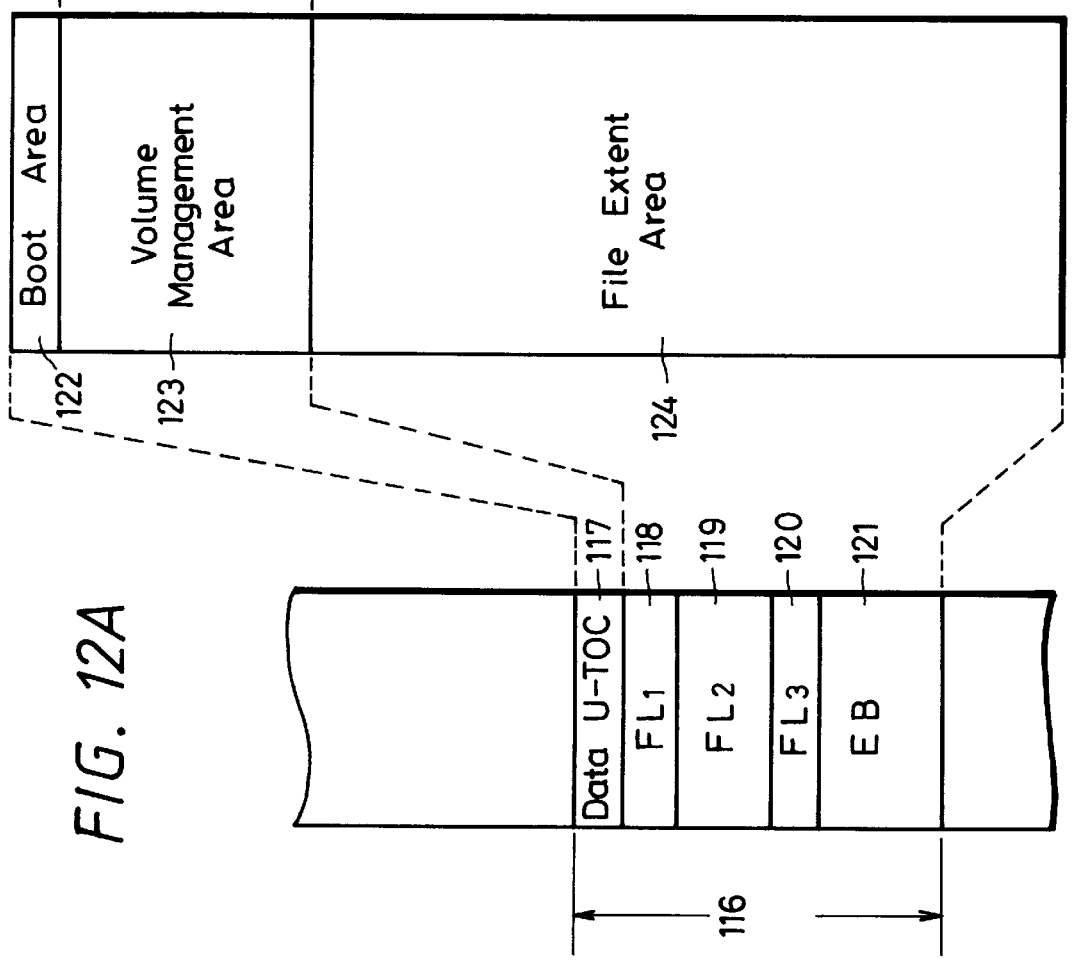

FIG. 13

| 16bit | | 16bit | |
|---|---|---|---|
| MSB    LSB | MSB    LSB | MSB    LSB | MSB    LSB |
| 0 sync | sync | sync | sync |
| 1 sync | sync | sync | sync |
| 2 sync | | sync | sync |
| 3 clusterH | clusterL | sector | mode |
| 4 00000000 | 00000000 | 00000000 | 00000000 |
| 5 00000000 | 00000000 | 00000000 | 00000000 |
| 6 00000000 | P | I | C |
| 7 M | D | 142 | 00000000 |
| 8 00000000 | 00000000 | 00000000 | 00000000 |
| 9 00000000 | 00000000 | 00000000 | 00000000 |
| 10 143 | | 144 | |
| 11 | | 00000000 | 00000000 |
| 12 146 | | | |
| 13 147 | | | |
| 14 148 | | | |
| 15 149 | | | |
| 16 150 | | | |
| 17 00000000 | 00000000 | 00000000 | 00000000 |
| 18 151 | | 152 | |
| 19 153 | | | |
| 20 154 | | 00000000 | 00000000 |
| 21 155 | | | |
| 22 156 | | | |
| 23 157 | | 158 | |
| 24 159 | | 160 | |
| 25 161 | | 162 | |
| 26 163 | | 164 | |
| 27 | | | |
| 28 166 | | 00000000 | 00000000 |
| 29 00000000 | 00000000 | 00000000 | 00000000 |
| 30 ⟶ 103 | | | |
| 517 | | | |
| 518 EDC0 | EDC1 | EDC2 | EDC3 |
| 519 P-parity0 | P-parity1 | P-parity2 | P-parity3 |
| 520 P-parity4 | P-parity5 | P-parity6 | P-parity7 |
| 521 P-parity8 | P-parity9 | P-parity10 | P-parity11 |
| 563 P-parity168 | P-parity169 | P-parity170 | P-parity171 |
| 564 Q-parity0 | Q-parity1 | Q-parity2 | Q-parity3 |
| 565 Q-parity4 | Q-parity5 | Q-parity6 | Q-parity7 |
| 587 Q-parity100 | Q-parity101 | Q-parity102 | Q-parity103 |

135, 136, 137, 138, 139, 140, 141

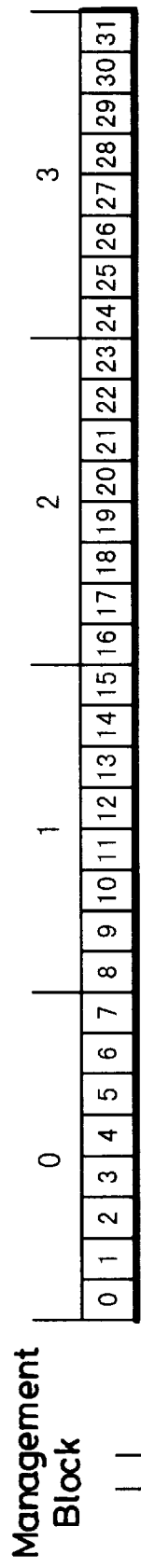
FIG. 17E Management Block
FIG. 17F Single DRB
FIG. 17G First DRB
Middle DRB
FIG. 17H Last DRB
Plural DRBs

FIG. 23

| 131 E R B | |
|---|---|
| Header | |
| FFFF | |
| 0000 | 2 |
| 0001 | 3 |
| | |
| 0004 | 4 |
| | |
| | |
| 0152 | 0002 |
| 0200 | 0001 |
| 0710 | 0003 |
| 1021 | 0001 |
| 1187 | 0002 |
| 1199 | 0002 |
| 1347 | 0002 |
| 1650 | 0001 |
| 1991 | 0002 |
| 2065 | 0002 |
| | |

290, 291, 292, 293
280, 281, 282
1, 2, 3

PICTURE SYNTHESIZING APPARATUS AND RECORDING MEDIUM

BACKGROUND OF THE INVENTION

1. Field of the Invention

The present invention relates to a picture synthesizing apparatus and a recording medium for use in a still picture control apparatus for editing a still picture information formed by reading a picture from a negative film, a photograph or the like, for example.

2. Description of the Related Art

There has been a picture reading apparatus for reading a picture as a picture data by using a scanner to record the read picture data on a rewritable recording medium. There has been also a picture synthesizing apparatus for further synthesizing the picture data read by the above picture reading apparatus with another picture data to produce a synthesized picture data.

When a picture in a design frame is synthesized by the picture synthesizing apparatus, the following operations are carried out. A design frame is produced by using a personal computer, and data of the produced design frame is recorded on the above recording medium. The data of the design frame recorded on the recording medium is supplied to the picture synthesizing apparatus. The picture synthesizing apparatus cuts or extracts a predetermined portion of the picture data read by the picture reading apparatus by using a key signal and then synthesizes the cut portion thereof and the design frame so that the cut portion should be located in the design frame, thereby obtaining the synthesized picture.

However, when recording the data of the design frame on the recording medium, the picture synthesizing apparatus according to the prior art employs the same recording format as that used when the picture data is recorded on the recording medium. Therefore, since the data of the picture, the design frame and the key signal must be arranged on the same recording format, a software for the picture synthesis disadvantageously becomes complicated and development of a software disadvantageously takes a considerable time.

SUMMARY OF THE INVENTION

In view of such aspects, it is an object of the present invention to provide a picture synthesizing apparatus which can drastically reduce time required for development of a software concerning picture synthesis.

According to a first aspect of the present invention, a picture synthesizing apparatus includes a reproducing means for reproducing a video data from a first recording medium where the video data is recorded in accordance with a data recording format having a hierarchical structure and for reproducing a synthesizing video data and a synthesizing key data from a second recording medium where the synthesizing video data and the key data are recorded in accordance with the same recording format as the data recording format, and a synthesizing means for, based on the key data, the video data and the synthesizing video data.

According to a second aspect of the present invention, a picture synthesizing apparatus includes a data reading means for reading a video data and a picture-synthesis data from a video data recording medium where the video data is recorded in accordance with a video data recording format having a hierarchical structure and a picture-synthesis data recording medium where the picture-synthesis data having a hierarchical structure similar to the hierarchical structure of the video data recording format is recorded, a video data storage means for storing the video data read out by the data reading means, a picture-synthesis data storage means for storing a picture-synthesis data used for picture synthesis read out by the data reading means, a key data storage means for storing a key signal data for picture synthesis, and a picture synthesizing means for synthesizing the video data and the picture-synthesis data by using data of the key signal. The synthesizing means clips out the video data by using the data of the key signal to synthesize the clipped video data with the picture-synthesis data.

According to a third aspect of the present invention, a recording medium includes a video data recording medium where a video data is recorded in accordance with a video data recording format having a hierarchical structure, and a picture-synthesis data recording medium where a picture-synthesis data having a hierarchical structure similar to the hierarchical structure of the video data recording format is recorded.

BRIEF DESCRIPTION OF THE DRAWINGS

FIG. 10 is a diagram used to explain an operation of the picture synthesizing apparatus according to the embodiment;

FIGS. 11A and 11B are diagrams showing a data structure of a video data used in the picture synthesizing apparatus according to the embodiment;

FIGS. 12A to 12C are diagrams showing a management block in the data structure shown in FIGS. 11A and 11B;

FIG. 13 is a diagram showing a sector structure of a volume descriptor VD of the management block shown in FIGS. 12A to 12C;

FIGS. 17A to 17H are diagrams showing a data arrangement of the management block table;

FIG. 23 is a diagram showing a structure of the extent record block ERB; and

DESCRIPTION OF THE PREFERRED EMBODIMENT

Before a picture synthesizing apparatus according to an embodiment of the present invention is described, a still picture controlling apparatus to which the picture synthesizing apparatus according to this embodiment is applied will be described with reference to FIGS. 1 to 6.

[arrangement of still picture controlling apparatus]

Figure 1:
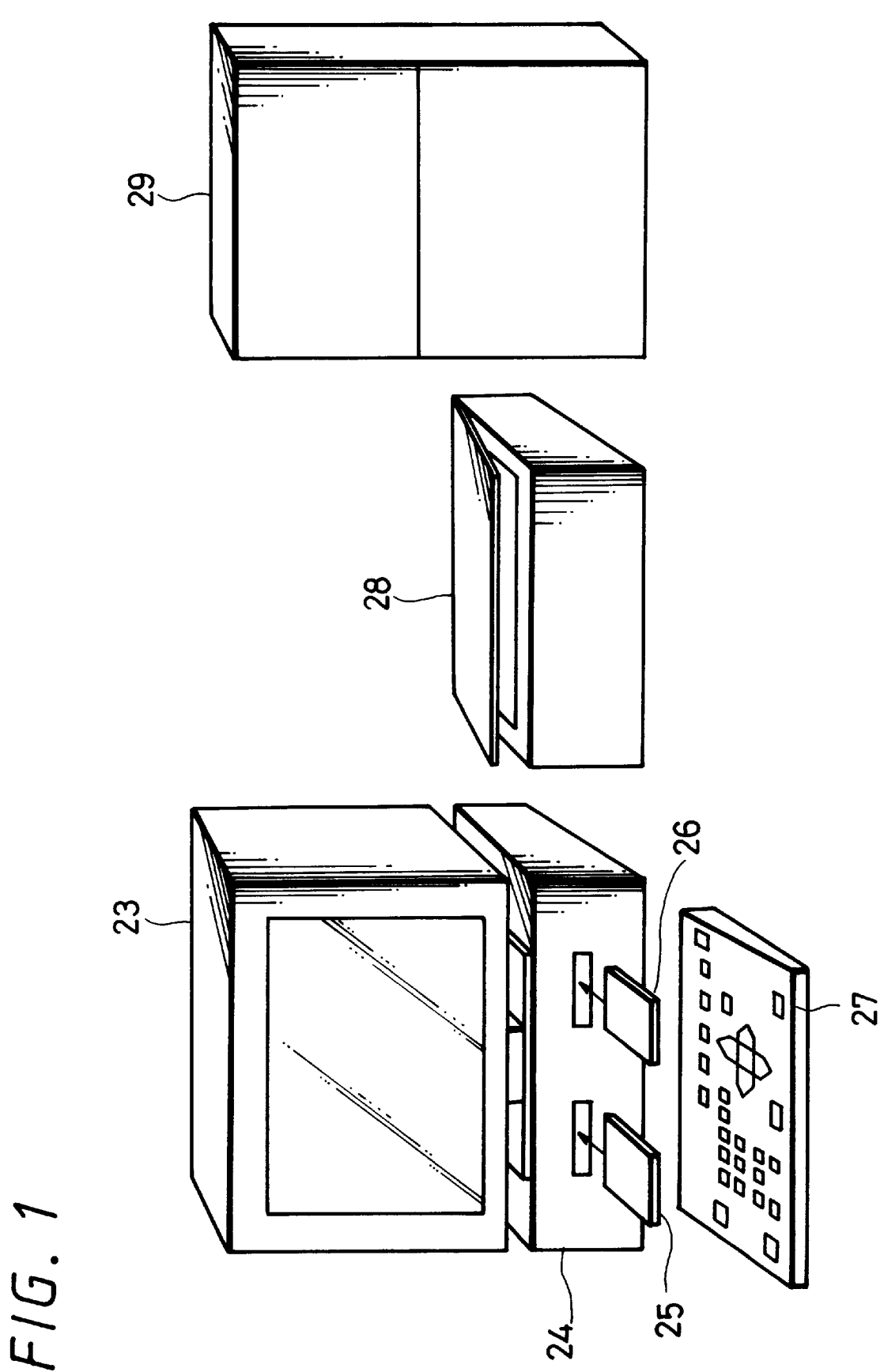
FIG. 1 is a diagram showing a still picture control apparatus employing a picture synthesizing apparatus according to an embodiment of the present invention.

As shown in FIG. 1, a still picture controlling apparatus 24 is arranged so that a picture data MD (mini disk) 25 and a texture MD 26 can be housed in respective MD drive units. In the picture data MD 25, picture data of high resolution, middle resolution and low resolution are recorded in accordance with a format of the picture data. In the texture MD 26, a character data, a picture data and so on are previously input and data of texture and a key data of high resolution, middle resolution and low resolution which are to be an initial picture of the picture synthesis are recorded. The still picture controlling apparatus 24 is connected with a monitor 23 for displaying the picture data, a key board 27 used for operations of designating operations of fetching, recording, reproducing and printing a video data and so on, a scanner 28 for reading a picture data, and a printer 29 for printing a video data.

Figure 2:
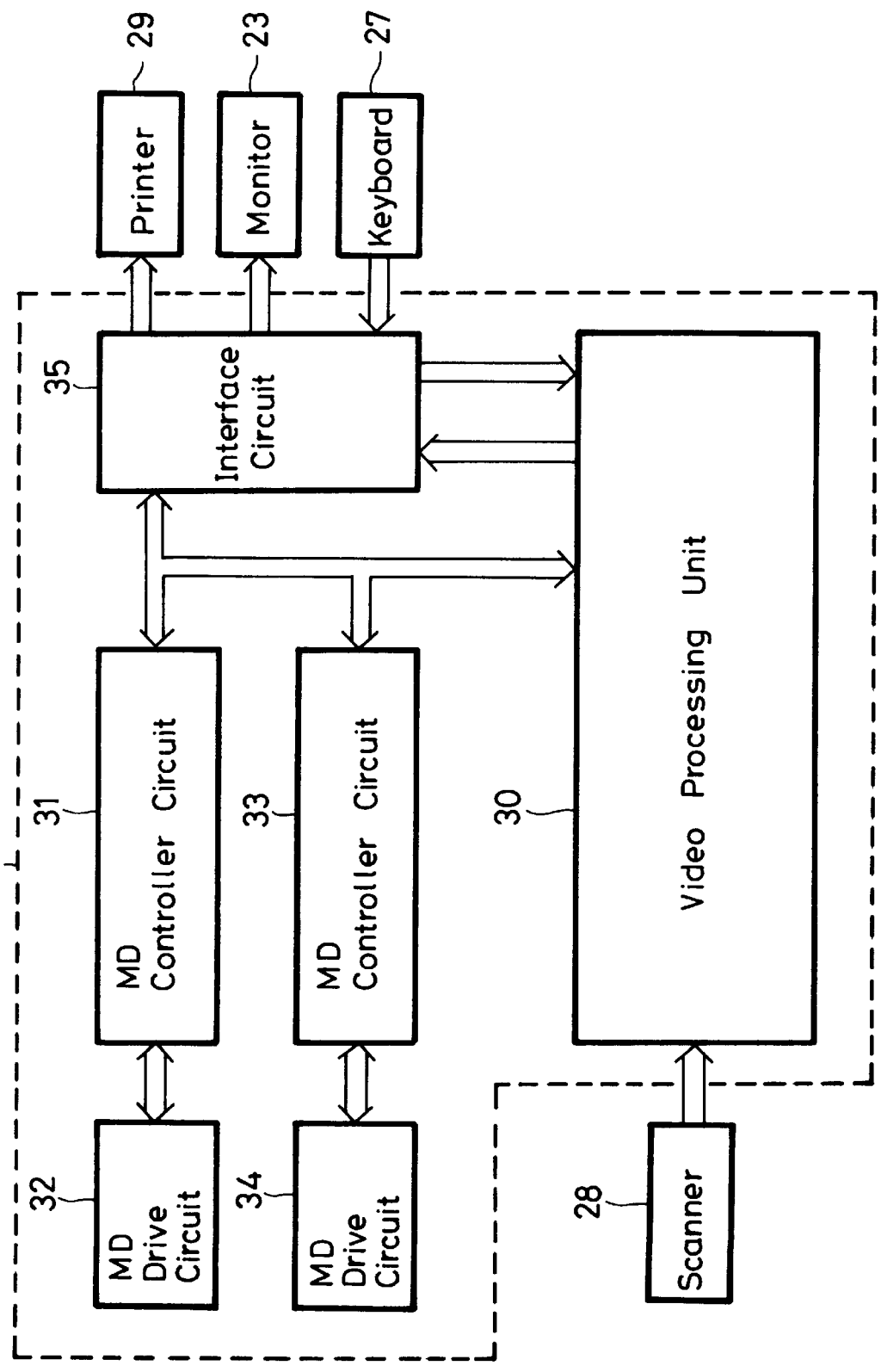
FIG. 2 is a block diagram showing an arrangement of the still picture control apparatus shown in FIG. 1.

As shown in FIG. 2, the still picture controlling apparatus 24 has a video processing circuit 30 for generating a high-resolution video data used for printing, a middle-resolution video data for the monitor 23 and a low-resolution video data used for displaying an index from the video data fetched by the scanner 28, MD controller circuits 31, 33 for generating the high-resolution video data, the middle-resolution video data and the low-resolution video data by generating a low-resolution video data used for displaying the index and for subjecting the reproduced high-resolution, middle-resolution and low-resolution video data to a signal processing for video processing, MD drive circuits 32, 34 for respectively recording or reproducing a video data and a texture data on or from the video data MD 25 and the texture MD 26, and an interface circuit 35 for interfacing the keyboard 27, the scanner 28 and the printer 29 and the still picture controlling apparatus 24.

[arrangement of scanner]

An arrangement of the scanner 28 will be described. The scanner 28 is formed of a CCD image sensor for reading a still picture recorded on a negative film, a positive film, a photograph and so on, an A/D converter for converting a video signal supplied as an analog signal from the CCD image sensor into a digital signal to thereby form a video data, a correction unit for subjecting the video data from the A/D converter to correction processings such as a shading correction, a color masking correction or the like, and an interface connected to a bus line.

[arrangement of printer]

An arrangement of the printer 29 will be described. The printer 29 is formed of an interface connected to a bus line, a data converting circuit for converting the video data supplied thereto into a data suitable for printing, and a thermal head for printing a still picture corresponding to the video data from the data converting circuit on a printing paper. A printing operation of the printer 29 is controlled in accordance with a print control data used for controlling the number of print sheets, tint and so on.

[arrangement of MD controller circuit]

Figure 3:
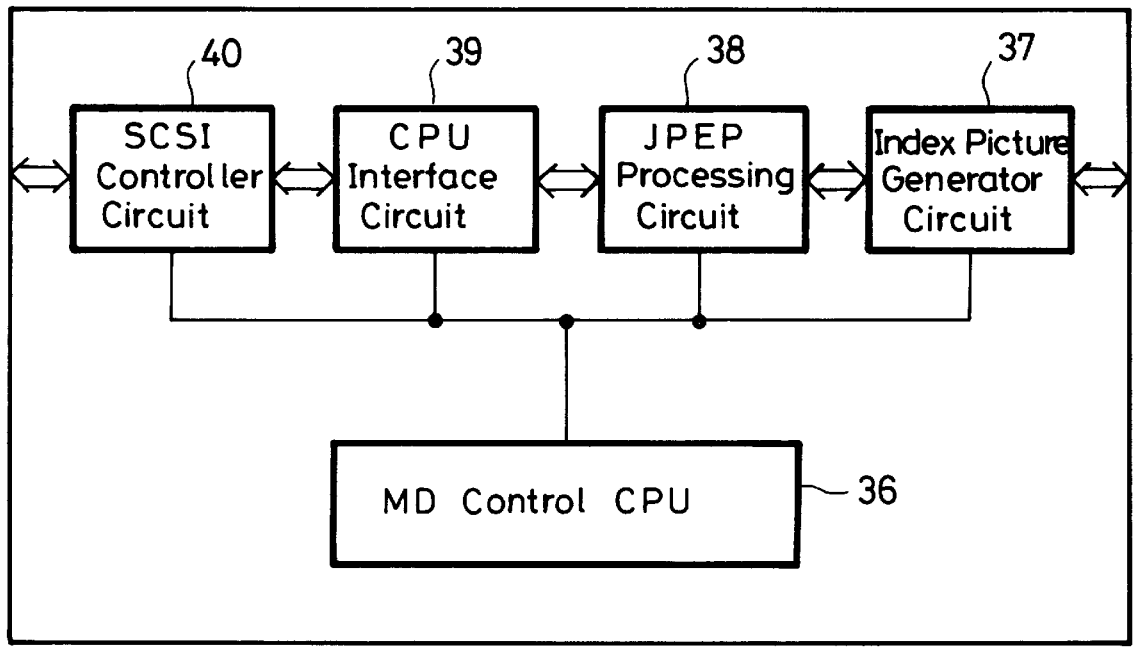
FIG. 3 is a block diagram showing an arrangement of an MD controller circuit of the still picture control apparatus shown in FIG. 1.

As shown in FIG. 3, each of the MD controller circuits 31, 33 has an MD control CPU 36 for controlling the whole circuit, an index picture generating circuit 37 for thinning out the middle-resolution video data to thereby generate the low-resolution video data, a JPEG processing circuit 38 for compressing and expanding the still picture, a CPU interface circuit 39 for buffering a data for interface for the recording or reproduction, and a SCSI controller circuit 40 for controlling a data transfer to the MD drive circuits 32, 34 in accordance with a SCSI command.

The index picture generating circuit 37 has a 1/64 thinning-out unit for thinning out the middle-resolution video data at a ratio of 1/64 to thereby form the low-resolution index video data. The JPEG processing circuit 38 has a raster block conversion unit for dividing the respective high-resolution, middle-resolution or low-resolution pixel data into blocks of a predetermined pixel unit suitable for compression processing, and a compression and expansion unit for subjecting the video data blocked by the raster block conversion unit to a fixed-length coding processing. This compression expansion unit has a discrete cosine transform circuit (DCT circuit), a quantizer circuit and a fixed-length coding circuit.

[arrangement of MD drive circuit]

Each of the MD drive circuits 32, 34 has an interface unit for interfacing it and the MD controller circuit, a controller for controlling each of the MD drive circuits 32, 34, an EFM circuit for subjecting the video data of the respective resolutions to an 8–14 modulation processing, and a disk recording and reproducing unit for recording or reproducing the video data and the texture data on and from each of the video data MD 25 and the texture data MD 26. The video data MD 25 forms a video data recording medium, the texture MD 26 forms a picture synthesis data recording medium, and the disk recording and reproducing unit forms a data reading means.

[arrangement of interface circuit]

Figure 4:
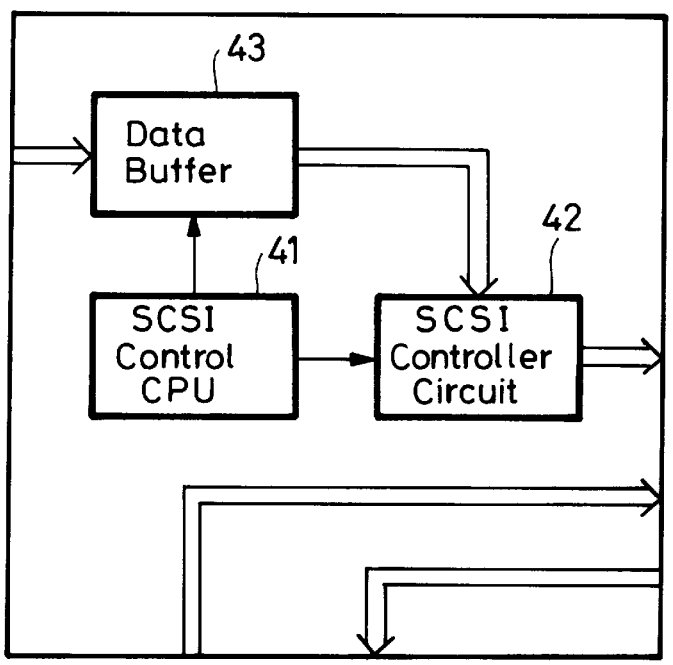
FIG. 4 is a block diagram showing an arrangement of an interface circuit of the still picture control apparatus shown in FIG. 1.

As shown in FIG. 4, the interface circuit 35 has a data buffer 43 for temporarily storing the high-resolution video data for the printing to be supplied to the printer 29, a SCSI controller circuit 42 for controlling the printer 29 in accordance with the SCSI command, and a SCSI control CPU 41 for controlling the data buffer 43 and the SCSI controller circuit 42. The interface circuit 35 is connected to the monitor 23 and the key board 27 only through data lines.

[arrangement of video processing circuit]

Figure 5:
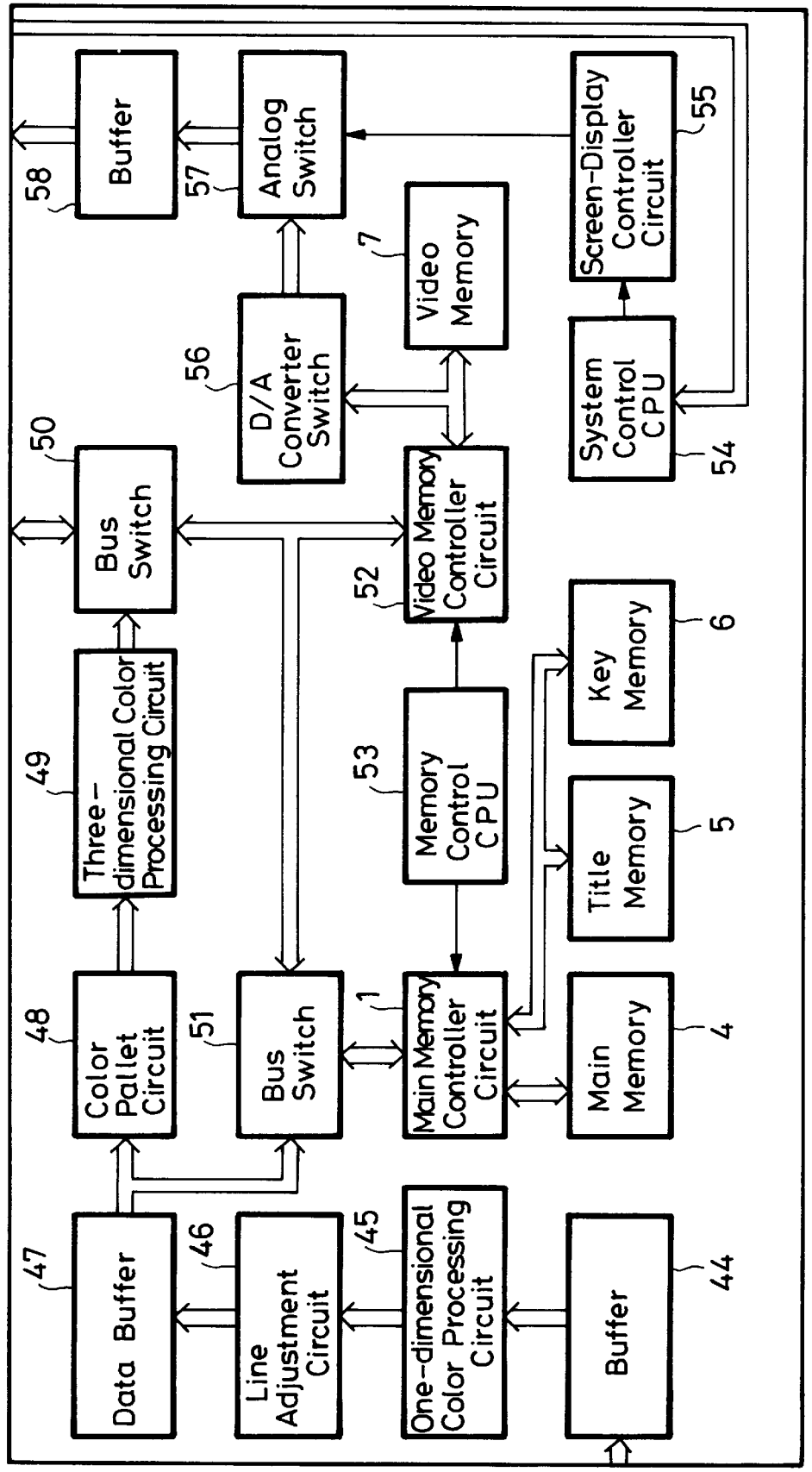
FIG. 5 is a block diagram showing an arrangement of a video processing circuit of the still picture control apparatus shown in FIG. 1.

As shown in FIG. 5, the video processing circuit 30 has a buffer 44 for temporarily storing video data read by the scanner 28, a one-dimensional color processing circuit 45 for carrying out a color processing with a one-dimensional look-up table, a line adjustment circuit 46 for carrying out a line adjustment, a data buffer 47 for temporarily storing a video data, a color palette circuit 48 for carrying out a coloring operation, a three-dimensional color processing circuit 49 for carrying out a color processing with a three-dimensional look-up table, and bus switches 50, 51 for switching bus lines.

The video processing circuit 30 also has a main memory 4 for storing a video data, a title memory 5 for storing a texture data, a key memory 6 for storing a key data, and a main memory controller circuit 1 for controlling operations of writing or reading the video data, the texture data and the key data in or from the main memory 4, the title memory 5 and the key memory 6 to synthesize pictures and for thinning out the high-resolution video data read by the scanner 28 to generate the middle-resolution video data. The main memory 4 forms a video data storage means, the title memory 5 forms a picture synthesis data storage means, and the key memory 6 forms a key data storage means.

The video processing circuit 30 has a video memory 7 for storing the middle-resolution video data used in the monitor 23, a video memory controller circuit 52 for controlling operations of writing or reading the video data in or from the video memory 7, and a main memory control CPU 53 for controlling the main memory controller circuit 1 and the video memory controller circuit 52.

The video processing circuit 30 has a system control CPU 54 for generating a control signal based on an input operation of the key board 27, a screen display controller circuit 55 for controlling a display on a screen of the monitor 23 based on the control signal from the system controller circuit 54, a D/A converter circuit 56 for converting the middle-resolution digital video data supplied from the video memory 7 and used for the monitor 23 into an analog video data, an analog switch 57 for switching the analog video data based on a screen display control signal from the screen display controller circuit 55, and a buffer 58 for temporarily storing the analog video data to be output to the monitor 23.

Each of the main memory 4 for temporarily storing the fetched video data, the title memory 5 and the key memory 6 is formed of a frame memory. The frame memory of each of the main memory 4 and the title memory 5 is formed of a R frame memory used for reading and writing a video data for a red color (R) therefrom and therein, a G frame memory used for reading and writing a video data for a green color (G) therefrom and therein, and a B frame memory used for reading and writing a video data for a blue color (B) therefrom and therein. The key memory 6 is formed of a frame memory for a single color.

Each of the above frame memories for the respective colors is formed of a DRAM (dynamic RAM). The frame memories can logically provide a main memory space formed of an area of height×width×color depth, i.e., an area of 2024 pixels×3072 pixels×8 bits×3 colors (RGB), a texture memory space formed of an area of height×width×color depth, i.e., an area of 2024 pixels×3072 pixels×8 bits×3 colors (RGB), and a key memory space formed of an area of height×width×color depth, i.e., an area of 2024 pixels×4096 pixels×4 bits×one color (one color of RGB). Thus, the above frame memories have the total storage area of 16 megabits.

The system control CPU 54 has a random access memory (RAM) for temporarily storing a management information of the video data read out from a mini disk when the video data is arranged again in order of reproduction and then recorded on the mini disk.

[arrangement of main memory controller circuit]

Figure 6:
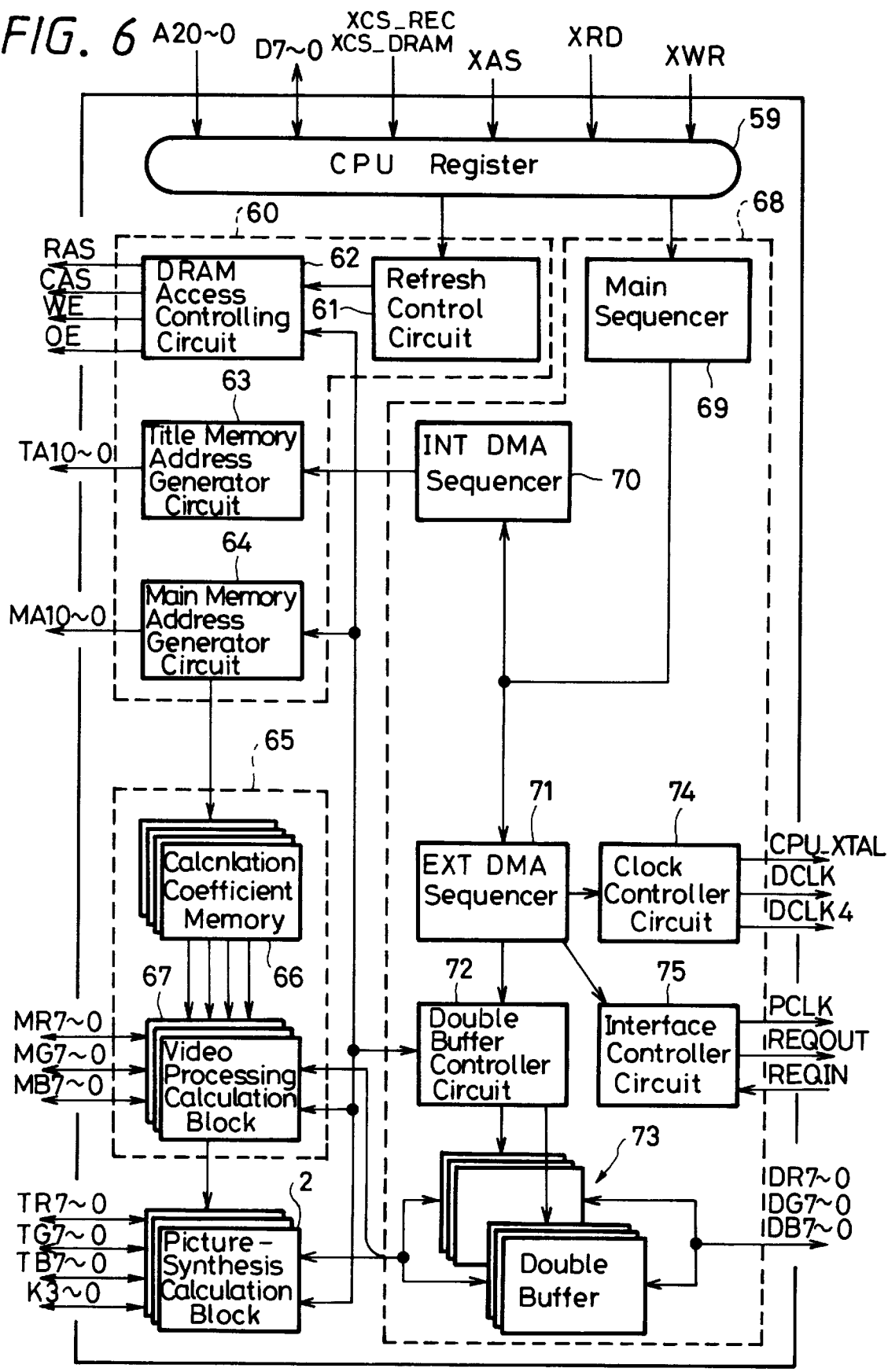
FIG. 6 is a block diagram showing an arrangement of a main memory controller circuit of the video processing circuit of the still picture control apparatus shown in FIG. 1.

As shown in FIG. 6, the main memory controller circuit 1 has a CPU register 59 for storing data and commands supplied from the memory control CPU 53, a memory access unit 60 for accessing the main memory 4, the title memory 5 and the key memory 6, a thinning-out and expanding processing unit 65 for thinning out the high-resolution video data to obtain the middle-resolution video data or expanding the middle-resolution video data to obtain the high-resolution video data, a picture-synthesis calculation block 2 for carrying our calculations for picture synthesis, and a direct memory access (DMA) processing unit 68 for carrying out an operation of a DMA transfer. The CPU register 59 is supplied with a chip selection signal (XCS_REG, XCS_DRAM), for accessing a register or a DRAM, a data write=or read signal (XWR or WRD), an address strobe signal (XAS), an address signal (A20 to 0), and data (D7 to 0).

[arrangement of memory access unit]

The memory access unit 60 has a DRAM access controlling circuit 62 for controlling the operations of respectively writing and reading the video data, the texture data and the key data in and from the DRAMs forming the main memory 4, the title memory 5 and the key memory 6, a title memory address generator circuit 63 for generating signals indicative of addresses of the title memory 5 and the key memory 6, a main memory address generator circuit 64 for generating a signal indicative of an address of the main memory 4, and a refresh control circuit 61 for controlling an operation of refreshing the DRAMs. The DRAM access controlling circuit 62 outputs a column address strobe signal (CAS), a row address strobe signal (RAS), a write-enable signal (WE), and an output enable signal (OE). The title memory address generator circuit 63 outputs a title memory address signals (TA10 to 0). The main memory address generator circuit 64 outputs a main memory address signal (MA10 to 0). The title memory address generator circuit 63 supplies address signals to the title memory 5 and the key memory 6.

[arrangement of thinning-out and expanding processing unit]

The thinning-out and expanding processing unit 65 has a calculation coefficient memory 66 for storing coefficients used for thinning-out and expansion operations, and a video processing calculation block 67 for carrying out calculations for the thinning-out and expanding operations. The video processing calculation block 67 has a 1/4 thinning-out unit for thinning out the high-resolution video data from the scanner 28 to form the middle-resolution video data having an amount equal to a quarter of the former, and a selector unit for selecting and outputting one of the high-resolution video data and the middle-resolution video data from the 1/4 thinning-out unit. The main memory data (MR7 to 0, MG7 to 0, and MB7 to 0) of the respective color R, B, G are input to and output from the video processing calculation block 67.

[arrangement of picture synthesis calculation block]

An arrangement of the picture-synthesis calculation block 2 will be described in detail with reference to FIG. 7 later on. The texture memory data (TR7 to 0, TG7 to 0, and TB7 to 0) of the respective color R, B, G are input to and output from the picture-synthesis calculation block 2.

[arrangement of DMA processing unit]

The DMA processing unit 68 has a main sequencer 69 for controlling a sequence operation of the DMA transfer, an INT DMA sequencer 70 for controlling a sequence operation of the DMA transfer for writing data, an EXT DMA sequencer 71 for controlling a sequence operation of the DMA transfer for reading data, a double buffer controller circuit 72 for switching two banks to control the operation of reading and writing data therefrom and therein, a double buffer 73 having the two banks, a clock controller circuit 74 for controlling a DMA transfer clock, and an interface controller circuit 75 for controlling an interface. The clock controller circuit 74 outputs a an operation clock signal (CPU_XTAL) for the memory control CPU 53, a video clock signal (DCLK), and a quadruple video clock signal (DCLK4). The interface controller circuit 75 outputs a video transfer clock signal (PCLK) and a DMA output and transfer requesting signal (REQOUT), and is input with a DMA input and transfer requesting signal (REQIN). Video output data (DR7 to 0, DG7 to 0, DB7 to 0) of the respective colors R, G, B are input to and output from the double buffer 73.

[arrangement of picture-synthesis calculation block]

Figure 7:
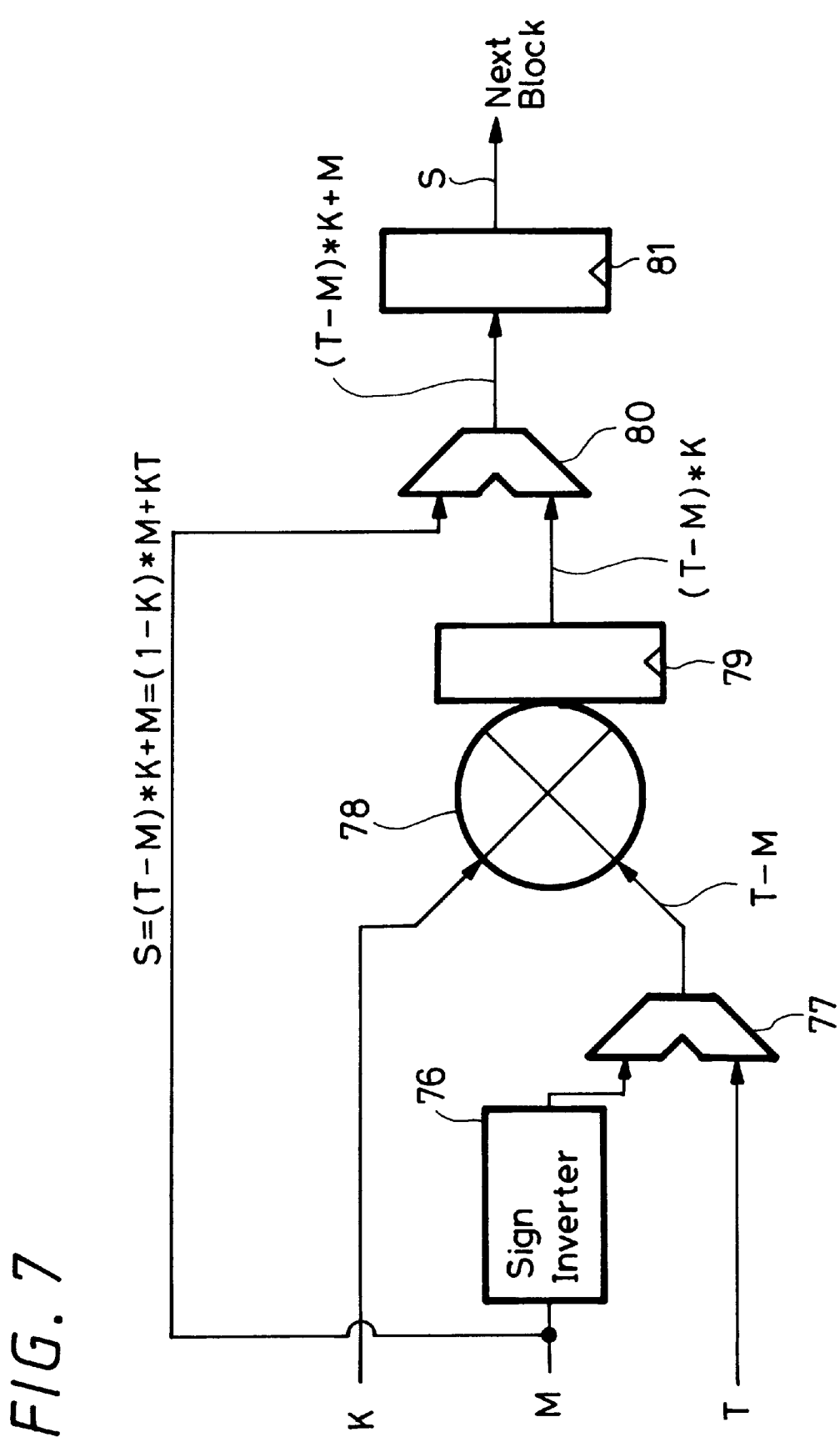
FIG. 7 is a block diagram showing an arrangement of a picture-synthesis calculation block of the main memory controller circuit shown in FIG. 5.

As shown in FIG. 7, the picture-synthesis calculation block 2 has a sign invertor 76 for inverting a sign of the main video data M, an adder 77 for adding an output from the sign invertor 76 and the title data T to thereby output an added output (T−M), a multiplier 78 for multiplying the added output (T−M) from the adder 77 and the key signal K to thereby output a multiplied output (T−M)*K, an adder 80 for adding the multiplied output (T−M)*K from the multiplier 78 and the main video data M to thereby output an added data [(T−M)*K+M], and a buffer 81 for temporarily storing the added data [(T−M)*K+M] from the adder 80. Therefore, a picture synthesis output S output from the buffer 81 is expressed as follows.

$$S=(T-M)*K+M=(1-K)*M+KT$$

The main video data M is formed of 8 bits for each of the colors R, G, B supplied from the video processing calculation block 67 of the thinning-out and expanding processing 65 shown in FIG. 6. The title video data T is formed of 8 bits for each of the colors R, G. B supplied from the title memory 5. The key signal K is formed of 8 bits for one of the colors R, G, B supplied from the key memory 6. The picture-synthesis calculation block 2 forms a picture synthesis means.

[outline of recording operation]

A normal recording operation of the still picture controlling apparatus having the above arrangement will hereinafter be described. When a desired video data and a desired texture data are respectively recorded on the video data MD 25 and a texture MD 26 loaded onto the above MD drive circuits 32 and 34, a user operates the above keyboard 27 to designate an equipment from which a video data or the like is fetched (i.e., the scanner 28) and to set the above MD drive circuits 32 and 34 as equipments to which the fetched video data are to be output. Thus, the system controller CPU 54 controls the scanner 28 to be brought in its operation state.

[explanation of operation of scanner]

An operation of the scanner 28 will be described. When a film, a photograph or the like is mounted on a copy reading face of the scanner 28, the scanner 28 makes its CCD line sensor scan the copy thereon to thereby read an image thereof. The CCD line sensor forms a video signal corresponding to the read image and supplies the video signal to an A/D converter. The A/D converter digitizes the video signal supplied from the CCD line sensor to form video data, and then supplies the video data to a correction unit. For example, when an image is read from a 35-mm film, the correction unit corrects the supplied video data so that the supplied video data should have a size of 1200 pixels×1700 pixels which is a size of height×width, and then outputs the corrected video data.

[explanation of operation of video processing circuit]

An operation of the video processing circuit 30 will be described. The video data formed by the scanner 28 is a high-resolution video data having a size of 1024 pixels× 1536 pixels or a size of 2048 pixels×3072 pixels which is a size of height×width. This high-resolution video data is supplied to the video memory 7 provided in the frame memory. When the video memory 7 is supplied with the high-resolution video data, the video memory controller circuit 52 temporarily stores this high-resolution video data and controls writing and reading operations of the video memory 7 to read the high-resolution video data stored in the video memory 7. The read high-resolution video data is transferred from the video memory 7 successively through the data line, the bus line and the bus switch 51 to the thinning-out and expanding processing unit 65 of the main memory controller circuit 1 and also to the main memory 4. The main memory controller circuit 1 controls the writing operation of the main memory 4 so that the high-resolution video data transferred to the main memory 4 should be temporarily stored therein.

When the main memory 4 stores the high-resolution video data, the video processing memory control CPU 53 controls the thinning-out and expanding processing unit 65 of the memory controller circuit 1 to convert the high-resolution video data into the middle-resolution video data used for display on the monitor and having a size of 640 pixels×480 pixels, for example. At this time, under the reading control of the memory controller circuit 1, the high-resolution video data is read out from the main memory 4, and then supplied therefrom to the thinning-out and expanding processing unit 65 of the memory controller circuit 1.

The above thinning-out and expanding unit 65 converts the high-resolution video data into the middle-resolution video data and then supplies the obtained middle-resolution video data through the bus switch 51, the bus line and the data line to the video memory 7. When the middle-resolution video data is supplied to the video memory 7, the video memory controller circuit 52 controls the writing operation of the video memory 7 so that the supplied middle-resolution video data should be temporarily stored therein, and then controls the reading operation of the video memory 7 so that the temporarily stored middle-resolution video data should be read out therefrom. At this time, the middle-resolution video data stored in the video memory 7 is read out therefrom and then supplied through the D/A converter circuit 56, the analog switch 57, the buffer 58 and the interface circuit 35 to the monitor 23.

As described above, the middle-resolution video data supplied to the video memory 7 is converted by the D/A converter circuit 56 into the analog video signal and serves as the middle-resolution video signal used for the display on the monitor 23. Thus, the picture fetched by the scanner 28 is displayed on the monitor 23. When the keyboard 27 is operated, if an image processing of the picture fetched by the scanner 28 such as a size enlargement processing thereof, a size reduction processing or the like is designated, then the system control CPU 54 of the video processing circuit 30 controls the thinning-out and expanding processing unit 65 of the main memory controller circuit 1 through the memory control CPU 53 so that the video data read out from the main memory 4 should be subjected to the designated video processing. The thinning-out and expanding processing unit 65 subjects the video data to the designated video processing and then supplies the processed video data to the monitor 23. Thus, the picture subjected to the designated video processing is displayed on the monitor 23. The system control CPU 54 supplies the data (video processing information) indicative of the video processing subjected to the video data through the bus line and the bus switch 51 to the thinning-out and expanding processing unit 65 of the main memory controller circuit 1.

[explanation of operation of thinning-out and expanding processing unit]

An operation of the thinning-out and expanding processing unit 65 will be described. With reference to the picture displayed on the monitor 23, the user confirms whether or not the picture displayed on the monitor 23 is a desired one. If the picture is the desired one, the user operates a recording command key of the keyboard 27 to give a command to record the picture displayed on the monitor 23. When the recording command key is operated, the system control CPU 54 detects an on-operation of the recording command key and, if there are data and video processing information indicative of designation with respect to the recording operation, then supplies them through the bus line and the bus switch 51 to the calculation coefficient memory 66 of the thinning-out and expanding processing unit 65.

If there is the video processing information, the calculation coefficient memory 66 temporarily stores it therein and controls the video processing calculation block 67 to fetch the high-resolution video data. When the high-resolution video data is fetched through the bus line and the bus switch 51 into the thinning-out and expanding processing block 67, the video processing calculation block 67, based on the video processing information stored in the calculation coefficient memory 66, controls the video processing so as to subject the high-resolution video data to the 1/4 thinning out processing at every line, for example. The 1/4 thinning out processing is a processing for reducing the pixel number of the high-resolution video data to 1/4 and is used to form the middle-resolution video data of 640 pixels×480 pixels.

The video processing calculation block 67 is switched under the control of the memory control CPU 53. Specifically, the memory control CPU 53 controls the video processing calculation block 67 to selectively output the video data of the respective resolutions generated by the video processing calculation block 67 in the order of the high-resolution video data and the middle-resolution video data. The video processing calculation block 67 transfers the video data of the respective resolutions through the double buffer 73 in the DMA processing unit 68 and further through the index picture generating circuit 37 of the MD controller circuits 31, 33 to the JPEG processing circuit 38.

[operation of index picture generating circuit]

The index picture generating circuit 37 subjects the middle-resolution video data to a 1/64 thinning-out processing. The 1/64 thinning-out processing is a processing for reducing the pixel number of the middle-resolution video data to 1/64 and is used to form the low-resolution video data (index video data) of 60 pixels×80 pixels.

[operation of JPEG processing circuit]

The index picture generating circuit 37 generates the low-resolution video data and then supplies it to the raster block converting unit of the JPEG processing circuit 38 together with the video data of the high and middle resolutions transferred through the double buffer 73 in the DMA processing unit 68 of the main memory controller circuit 1. The raster block converting unit divides the respective video data into the processing blocks each formed of 8 pixels×8 pixels which is a processing unit for the compression coding and supplies the processing blocks to the compression and expansion processing unit.

The raster block converting unit divides the video data of the respective resolutions into the processing blocks each having a size of 8 pixels×8 pixels, while the low-resolution video data has a picture size of 60 pixels×80 pixels. Therefore, even if the raster block converting unit attempts to divide the low-resolution video data into the processing blocks of 8 pixels×8 pixels, it is impossible to divide the low-resolution video data into the processing blocks each having a size of 8 pixels×8 pixels because the number of the pixels in the width direction cannot be divided by 8 pixels (60 pixels÷8 pixels=7.5 pixels).

Therefore, when being supplied wit h the low-resolution video data, the raster block converting unit adds a dummy data having a size of 4 pixels×80 pixels to the low-resolution video data at its uppermost portion or lowermost portion, thereby converting the low-resolution video data having a size of 60 pixels×80 pixels into the low-resolution video data having a size of 64 pixels×80 pixels. Since this conversion permits the number of the pixels in the width direction to be divided by 8 pixels, the raster block converting unit divides the low-resolution video data of 64 pixels× 80 pixels into the processing blocks of 8 processing blocks× 10 processing blocks and then supplies the processing blocks to the compression and expansion processing unit. The dummy data is removed when the index picture is displayed, and hence a picture (e.g., a block picture or a white picture) obtained from the dummy data is prevented from being displayed with being added to the index picture.

The compression and expansion unit is formed of a discrete cosine transform circuit (DCT circuit), a quantizer circuit, and a fixed-length coding circuit. The video data of the respective resolutions are initially supplied to the DCT circuit. The DCT circuit carries out an orthogonal conversion processing for converting the video data of the respective resolutions on a frequency axis to form DCT coefficients, and then supplies the video data of the respective resolutions subjected to the above orthogonal conversion processing to the quantizer circuit. The quantizer circuit quantizes the video data of the respective resolutions by using a proper quantization coefficient set by the MD control CPU 36, for example, and then supplies the quantized video data to the fixed-length coding circuit.

The fixed-length coding circuit fixed-length-codes the DCT coefficients of the video data of the respective resolutions quantized by using the proper quantization coefficient and feeds a result of the fixed-length coding processing back to the MD control CPU 36. In response to the result of the fixed-length coding processing, the MD control CPU 36 generates a quantization coefficient most suitable for quantizing the video data and then the most proper quantization coefficient to the quantizing circuit. The quantizing circuit quantizes the video data by using the most proper quantization coefficient set at the second time and then the quantized video data to the fixed-length coding circuit. Thus, the fixed-length coding circuit can fixed-length code the video data of the respective resolutions so that the video data of the respective resolutions should have a predetermined data length.

Specifically, through the above compression coding processing, the middle-resolution video data is subjected to the fixed-length coding processing so as to have a data length of two cluster amounts which is twice as much as one cluster as a recording unit, the high-resolution video data is subjected to the fixed-length coding processing so as to have a data length of eight cluster amounts, and the low-resolution video data is subjected to the fixed-length coding processing so as to have a data length of 1/15 cluster amount. The JPEG circuit 38 of the MD controller circuit 31 supplies the video data of the respective resolutions thus subjected to the fixed-length coding processing through the CPU interface circuit 39 and the SCSI controller circuit 40 to the MD drive circuit 32. The SCSI controller circuits 40 converts an operation command for the MD drive circuit 32, which is supplied from the MD control CPU 36 thorough the CPU interface circuit 39, into a SCSI command. The SCSI controller circuit 40 transfers the video data of the respective resolutions to the MD drive circuit 32 based on the SCSI interface. When the video processing information is added to the supplied video data, the MD control CPU 36 supplies the video processing information to the MD drive circuit 34.

The MD controller circuit 33 similarly carries out the above processings.

[explanation of operation of MD drive circuit]

The video data of the respective resolutions and the video processing informations supplied from the MD controller circuits 31 and 33 are respectively supplied to the interface units of the MD drive circuits 32, 34. When the video data of the respective resolutions and the video processing informations are supplied to the interface units, the controllers of the MD drive circuits 32, 34 respectively control the interface units to fetch the video data of the respective resolutions and the video processing informations to the MD drive circuits 32, 34. The video data of the respective resolutions and the video processing informations fetched to each of the MD drive circuits 32, 34 through its interface unit are supplied to its EEM circuit. When the EFM circuit is supplied with the video data of the respective resolutions and the video processing informations, the controller controls the EFM circuit to subjects the fixed-length-coded video data of the respective resolutions and the fixed-length-coded video processing informations to an eight-to-fourteen modulation processing (a so-called EFM processing). The EFM circuit supplies the video data of the respective resolutions and the video processing informations subjected to the EFM processing to the disk recording and reproducing unit. When the disk recording and reproducing unit is supplied with the video data of the respective resolutions and the video processing informations, the controller controls the disk recording and reproducing unit to record the video data of the respective resolutions and the video processing informations on the video data MD 25. Thus, the video data of the respective resolutions and the video processing informations are recorded on the video data MD 25.

Similarly, through the operation of the MD drive circuit 34, the texture data are recorded on the texture data MD 26.

Specifically, each of the video data MD 25 and the texture data MD 26 is a magneto-optical disk with a diameter of 64 mm on which the video data or the texture data corresponding to an amount of 200 pictures can be rewritten at any times with respect to each of the resolutions. The video data or the texture data corresponding to an amount of 200 pictures are divided into four albums each having the video data or the texture data corresponding to an amount of 50 picture, thereby being managed. Therefore, when the video data or the texture data are recorded, the user selects, by using the keyboard 27, the album in which the video data or the texture data is to be recorded. In accordance with the user's operation of the keyboard 27, the system control CPU 54 controls the disk recording and reproducing unit of the MD drive circuit 32 or 34 to record the video data or the texture data of the respective resolution in the album the user selects in order of the fetching operation.

At this time, the low-resolution video data is recorded as an index file used for displaying a plurality of the pictures recorded in the album on one screen. The middle-resolution video data is recorded as a middle-resolution picture file used for displaying one desired picture recorded in the album on the monitor 23. The high-resolution video data is recorded as a high-resolution picture file used for printing the picture obtained from the high-resolution video data.

[arrangement of picture synthesizing apparatus according to this embodiment]

A picture synthesizing apparatus according to an embodiment of the present invention will hereinafter be described with reference to FIG. 8. The picture synthesizing apparatus according to this embodiment shown in FIG. 1 corresponds to the main controller circuit 1, the picture-synthesis calculation block 2, the main memory 4, the title memory 5, the key memory 6 and the video memory 7, which are shown in FIG. 5, of the video processing circuit 30 shown in FIG. 2 of the above still picture controlling apparatus.

Figure 8:
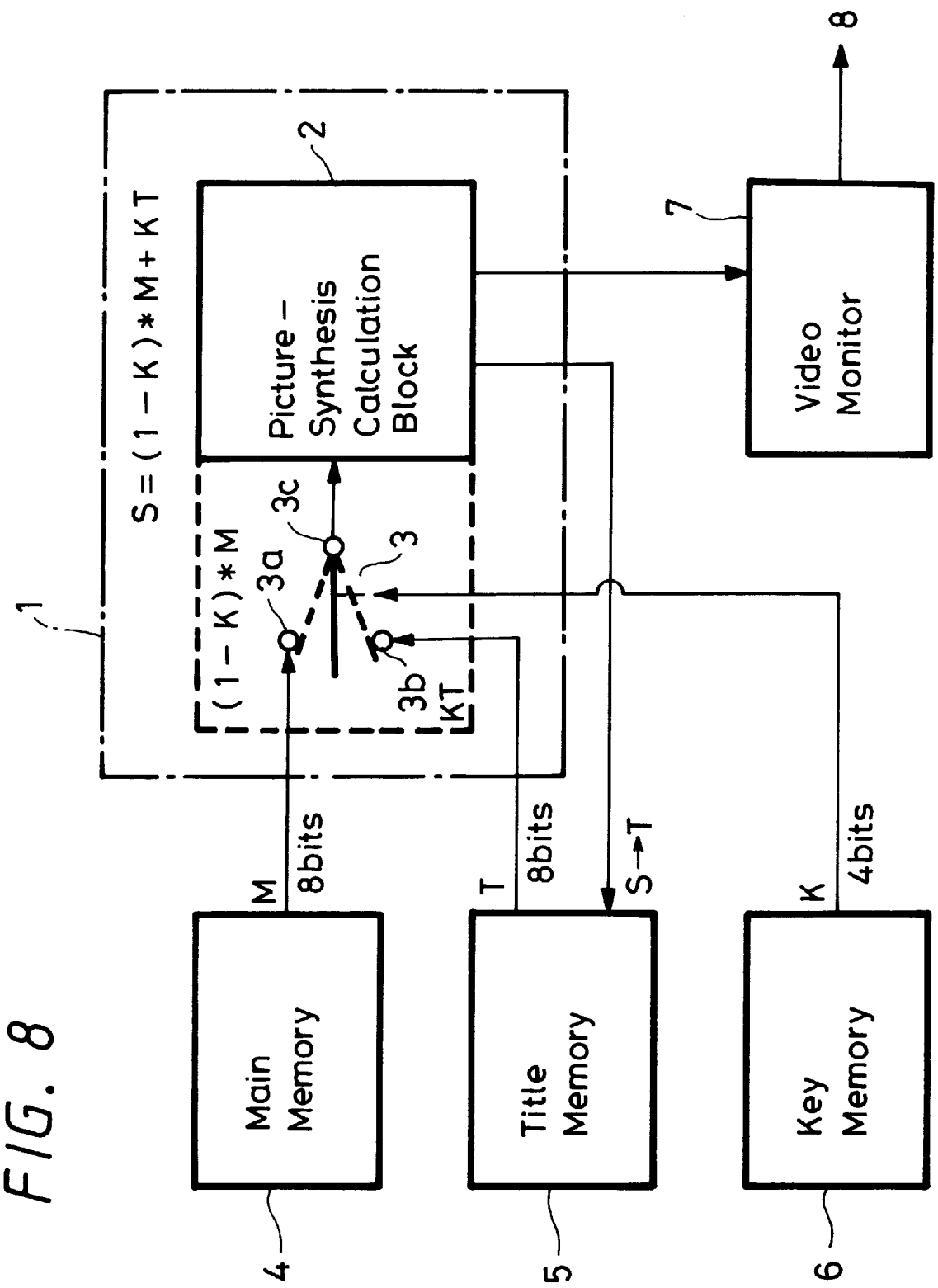
FIG. 8 is a block diagram showing an arrangement of a picture synthesizing apparatus according to the embodiment of the present invention.

In FIG. 8, like units, circuits and so on corresponding to those shown in FIGS. 1 to 7 are marked with the same reference numerals and hence need not to be described in detail. An arrangement of the picture synthesizing apparatus according to this embodiment will be described. As shown in FIG. 8, the picture synthesizing apparatus according to this embodiment has a main memory controller circuit 1, a main memory 4, a title memory 5, a key memory 6, a video memory 7, and a monitor 8 (not shown). The main memory controller circuit 1 has a picture-synthesis calculation block 2 and a switch 3. The switch 3 has a fixed contact 3a, fixed contact 3b, and a movable contact 3c. In this case, the switch 3 is not a mechanical switch but a functional representation of a picture synthesizing operation of the picture-synthesis calculation block 2.

When the main memory 4 stores a video data, the video data is supplied to the main memory 4 after being read out by the above scanner 28 or after being read out from a video data MD 25. When the title memory 5 and the key memory 6 respectively store a texture data and a key signal data, the texture data and the key signal data are respectively supplied to the title memory 5 and the key memory 6 after being read out by the scanner 28 or after being read out from a texture data MD 26.

In this case, the video data MD 25 forms a video data recording medium. The texture data MD 26 forms a picture-synthesis data recording medium. The main memory 4 forms a video data storage means. The title memory 5 forms a picture-synthesis data storage means. The key memory 6 forms a key data storage means. The picture-synthesis calculation block 2 and the switch 3 form a picture synthesizing means.

Video data of high resolution, middle resolution and low resolution, i.e., first, second and third pictures $M_1$, $M_2$, $M_3$ of high resolution each having a size of 3072 pixels×2048 pixels shown in FIG. 10 are recorded in the main memory 4 in accordance with a video data format described later on. In FIG. 10, character data, i.e., characters 9, 10 of high resolutions each having a size of 3072 pixels×2048 pixels, video data and so on are previously input to the title memory 5. Texture data $T_1$ of high resolution, middle resolution and low resolution serving as initial pictures upon picture synthesis are previously recorded in the title memory 5. During the processing of the picture synthesis, a first synthesized output $S_1$ and a second synthesized output $S_2$ are stored in the title memory 5 as a second texture data $T_2$ and a third texture data $T_3$, respectively. In FIG. 10, data $K_1$ and $(1-K_1)$, $K_2$ and $(1-K_2)$, $K_3$ and $(1-K_3)$ of the key signals K of high resolution having a size of 3072 pixels×2048 pixels are recorded in the key memory 6.

Particularly, according to this embodiment, as described later on, since a format of a video data is utilized for a format of the texture data to thereby designate an area used for storing a plurality of texture data and a plurality of key signal data, a process of developing a software concerning a synthesis of the texture data and the video data can be drastically reduced.

The switch 3 is arranged such that the movable contact 3c can be connected to the fixed contact 3a or the fixed contact 3b based on the key signal K. The fixed contact 3a is connected to the main memory 4. When the movable contact 3c is connected to the fixed contact 3a based on the key signal K, the data (1−K)*M clipped out from the video data M based on the key signal K can be supplied to the picture-synthesis calculation block 2. The fixed contact 3b is connected to the title memory 5. When the movable contact 3b is connected to the fixed contact 3b based on the key signal K, data KT remained by extracting data clipped out based on the key signal K from the texture data T can be supplied to the picture-synthesis calculation block 2.

Thus, the picture-synthesis calculation block 2 outputs a synthesized output signal S=(T−M)*K+M=(1−K)*M+KT as shown in FIG. 7. The video memory 7 stores the middle-resolution video data used to be displayed on the monitor 8.

[operation of picture synthesizing apparatus according to this embodiment]

Figure 9:
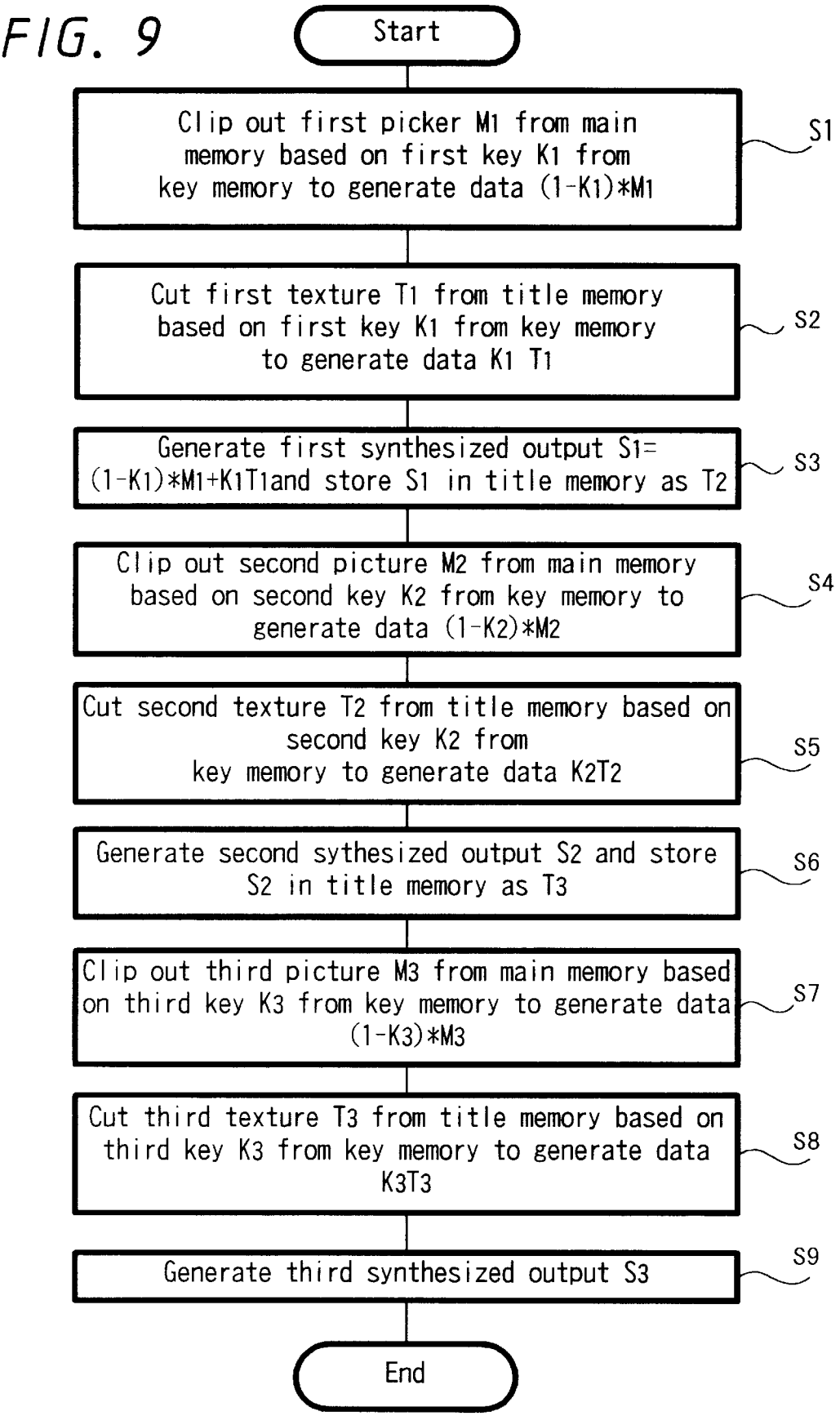
FIG. 9 is a flowchart used to explain an operation of the picture synthesizing apparatus according to the embodiment.

An operation of the picture synthesizing apparatus according to this embodiment will be described with reference to FIGS. 8 to 10.

FIG. 2 is a flowchart used to explain the operation of the picture synthesizing apparatus according to this embodiment. In the flowchart shown in FIG. 2, after the processing of the picture synthesizing apparatus is started, the processing proceeds to step Si, wherein the switch 3 is operated and a first picture $M_1$ from the main memory 4 is clipped out from a video data based on the a first key signal $K_1$ from the key memory 6 to generate data $(1-K_1)*M_1$. At this time, in the switch 3 shown in FIG. 8, the movable contact 3c is connected to the fixed contact 3a based on the first key signal $K_1$. The data $(1-K_1)*M_1$ clipped out from the video data $M_1$ based on the first key signal $K_1$ is supplied form the switch 3 to the picture-synthesis calculation block 2. Then, the processing proceeds to step S2.

In step S2, in switch 3, a data $K_1T_1$ is generated by extracting data clipped out based on the first key signal $K_1$ of the key memory 6 from a first texture data $T_1$. At this time, in the switch 3 shown in FIG. 8, the movable contact 3c is connected to the fixed contact 3b based on the key signal $K_1$. Thus, the data $K_1T_1$ remained by extracting the data clipped out based on the first key signal $K_1$ from the first texture data $T_1$ is supplied to the picture-synthesis calculation block 2. Then, the processing proceeds to step S3.

In step S3, the picture-synthesis calculation block 2 generates a first synthesized output $S_1=(1-K_1)*M_1+K_1T_1$ and stores the first synthesized output Si in the title memory 5. The title memory 5 stores the first synthesized output $S_1$ as a second texture data $T_2$. At this time, while in the switch 3 shown in FIG. 8 the movable contact 3c is connected to the fixed contact 3b based on the key signal $K_1$, the picture-synthesis calculation block 2 returns the first synthesized output $S_1$ to the title memory 5, thereby the title memory 5 storing the first synthesized output SI as the second texture data $T_2$. Then, the processing proceeds to step S4.

In step S4, in the switch 3, a second picture $M_2$ from the main memory 4 is clipped out from a video data based on the a second key signal $K_2$ from the key memory 6 to generate data $(1-K_2)*M_2$. At this time, in the switch 3 shown in FIG. 8, the movable contact 3c is connected to the fixed contact 3a based on the key signal $K_2$. The data $(1-K_2)*M_2$ clipped out from the video data $M_2$ based on the second key signal $K_2$ is supplied form the switch 3 to the picture-synthesis calculation block 2. Then, the processing proceeds to step S5.

In step S5, in switch 3, a data $K_2T_2$ is generated by extracting data clipped out based on a second key signal $K_2$ from a second texture data $T_2$ from the title memory 5. At this time, in the switch shown in FIG. 8, the movable contact 3c is connected to the fixed contact 3b based on the key signal $K_2$. Thus, the data $K_2T_2$ remained by extracting the data clipped out based on the second key signal $K_2$ from the second texture data $T_2$ is supplied to the picture-synthesis calculation block 2. Then, the processing proceeds to step S6.

In step S6, the picture-synthesis calculation block 2 generates a second synthesized output $S_2=(1-K_2)*M_2+K_2T_2$ and supplies the second synthesized output $S_2$ to the title memory 5. The title memory 5 stores the second synthesized output $S_2$ as a third texture data $T_3$. At this time, while in the switch 3 shown in FIG. 8 the movable contact 3c is connected to the fixed contact 3b based on the key signal $K_2$, the picture-synthesis calculation block 2 returns the second synthesized output $S_2$ to the title memory 5, thereby the title memory 5 storing the second synthesized output $S_2$ as the third texture data $T_3$. Then, the processing proceeds to step S7.

In step S7, in the switch 3, a third picture $M_3$ from the main memory 4 is clipped out from a video data based on the a third key signal $K_3$ from the key memory 6 to generate data $(1-K_3)*M_3$. At this time, in the switch 3 shown in FIG. 8, the movable contact 3c is connected to the fixed contact 3a based on the third key signal $K_3$. The data $(1-K_3)*M_3$ clipped out from the video data $M_3$ based on the third key signal $K_3$ is supplied form the switch 3 to the picture-synthesis calculation block 2. Then, the processing proceeds to step S8.

In step SB, in switch 3, a data $K_3T_3$ is generated by extracting a third texture data $T_3$ from data of the title memory 5 based on a third key signal $K_3$ from the key memory 6. At this time, in the switch 3 shown in FIG. 8, the movable contact 3c is connected to the fixed contact 3b based on the third key signal $K_3$. Thus, the data $K_3T_3$ remained by extracting the data clipped out based on the third key signal $K_3$ from the third texture data $T_3$ is supplied to the picture-synthesis calculation block 2. Then, the processing proceeds to step S9.

In step S9, the picture-synthesis calculation block 2 generates a third synthesized output $S_3=(1-K_3)*M_3+K_3T_3$ as a synthesized picture.

As described above, the picture-synthesis calculation block 2 successively returns the first synthesized output $S_1$ and the second synthesized output $S_2$ to the title memory 5 and stores them therein as the second texture data $T_2$ and the third texture data $T_3$, thereby generating the synthesized picture $S_3$. The picture-synthesis calculation block 2 thins out the synthesized picture $S_3$ in a thinning-out and expansion processing unit 65 of the main memory controller circuit 1 shown in FIG. 6 and then carries out a DMA transfer of the thinned-out synthesized picture $S_3$ by a DMA transfer unit 68, thereby supplying it to the video memory 7. Then, the synthesized picture $S_3$ is displayed on the monitor 8.

While in this embodiment the character data is employed as the texture data and synthesized with the video data, data obtained by synthesizing the character data and the video data may be employed as the texture data and synthesized with another video data.

The present invention is not limited to the character data. A design data or the like may be recorded by a personal computer or the like on the texture MD 26 in accordance with the above texture data recording format to synthesize the design data as the texture data with the video data.

[explanation of video data format for mini disk]

A video data format of a mini disk will be described with reference to FIGS. 11 to 23. A video data formatted in accordance with the video data format for the mini disk is recorded on the video data MD 25 shown in FIG. 1. A mini disk on which such video data of the respective resolutions are recorded has a new format used for recording the video data which will hereinafter be described.

[cluster structure]

A cluster structure in the video data recording format of the mini disk will initially be described. A data is recorded on and reproduced from the mini disk by a unit of the "cluster". One cluster corresponds to tracks included in a few concentric rings of the mini disk. Such clusters are continuously recorded in view of time to form one data track. One cluster is formed of a subdata area of four sectors (one sector is formed of 2352 bytes) and a main data area of thirty-two sectors. An address is recorded for each of the sectors.

In each of the sectors each formed of 2352 bytes, data are practically recorded on an area of 2048 bytes. A header data of a period pattern, an address or the like, an error correction code or the like is recorded in the rest of the cluster area, i.e., an area of 307 bytes. In the subdata area of four sectors, when a subdata or a data not only recorded on the cluster but also to be continuously recorded on another area is recorded on the cluster, a linking data indicating that the data recorded on the cluster is continuously recorded on another area or the like is recorded. A table-of-contents (TOC) data, an audio data, a video data and so on are recorded on the main data area of thirty-two sectors.

[track structure]

A track structure will be described. As shown in FIG. 11A, the whole area of the mini disk is formed of a pit area 100 where data is recorded in the form of embossed pits and a magneto-optical area (MO area) 101 where a groove is provided and data are recorded and reproduced magneto-optically. The pit area 100 is a management area 102 dedicated to reproduction where a pre-mastered table-of-contents (P-TOC) 107 serving as a management information recorded on the mini disk is recorded, where a P-TOC sector described later on is repeatedly recorded.

The MO area 101 is provided at a portion from a portion immediately after a read-in area 106 at an innermost periphery side of the disk to an end of a read-out area 114 located at an outermost periphery side of the mini disk. Of the MO area 101, a portion from a portion immediately succeeding to the read-in area 106 located at the innermost periphery side of the disk to a portion immediately preceding to the read-out area 114 located at the outermost periphery side of the disk is set as a recordable area 103. The recordable area 103 is formed of a recording and reproduction management area 104 formed at the head of the recordable area 103, and a recordable area 105 formed between the portion immediately succeeding the recording and reproduction management area 104 and the portion immediately preceding to the read-out area 114.

Data files "$FL_1$" 109, "$FL_2$" 110, "$FL_3$" 111 having video data and a data U-TOC' 108 for managing each of data files are recorded in the data track. While the "data U-TOC" 108 may be recorded at any position in the recordable area 103, in the still picture controlling apparatus the "data U-TOC" 108 is recorded immediately before the data file "$FL_1$" 109 which is a data file located at the innermost periphery side of the disk of the data files of the video data.

As shown in FIG. 11B, the "data U-TOC" 108 manages the respective data files "$FL_1$" 109, "$FL_2$" 110, "$FL_3$" 111 in the data track as one data track 115. An unrecorded block "EB" 112 included in the data track is managed at a cluster unit by the data U-TOC" 108 recorded at the stage preceding to the data file "$FL_1$" 109. A free area 113 is a spare area.

[arrangement of data track]

An arrangement of the data track will be described with reference to FIGS. 12A, 12B and 12C. There will be described a data track 116 where data files "$FL_1$" 118, "FL2" 119, "$FL_3$" 120 and a data U-TOC 117 are recorded. The data U-TOC 117 recorded in the data track 116 manages the data files "$FL_1$" 118, "$FL_2$" 119, "$FL_3$" 120 recorded in the data track 116 as parts (track parts on a disk where a series of data are physically continuously recorded).

The data U-TOC 117 is recorded at the physical head position of the data track 116. Specifically, the data U-TOC 117 is recorded at the position of the disk innermost periphery side in the data track 116. If the data track 116 is divided into a plurality of parts, then the data U-TOC 117 is recorded at the head of the part located on the disk innermost periphery side.

The data U-TOC 117 is formed of a boot area 112 of one cluster and a volume management area 123 of sixteen clusters. An area succeeding the data U-TOC 117 is a file extent area 124. The data files "$FL_1$" 118, "$FL_2$" 119, "$FL_3$" 120 including the video data, an unrecorded block "EB" 121 and so on are recorded in the file extent area 124. In the file extent area 124, data can be further recorded in the unrecorded block "EB" 121.

The volume management area 123 is formed of total 1024 management blocks, i.e., 0th to 1023rd management blocks 134. One management block has a data area of 2048 bytes. Data recorded in the management block is a management information used for recording and reproducing the data file.

Specifically, the 1024 management blocks 134 are numbered with block numbers of 0 to 1023, and the management block having the block number 0 is used as a "volume descriptor VD" 125. In this case, a "volume" is a unit including all the parts where general data including the video data are recorded. The management block having the block number 1 is used as a "volume space bit map VSB" 126. The management blocks having the block numbers 2 and 3 are used as "management tables MT" 127, 128, respectively. The management blocks having the block numbers equal to or larger than 4 are used as, for example, "directory record blocks DRB" 129, 130, 132, "extent record blocks ERB" 131, 133 depending upon a used state of the file extent area 124.

Each of the management blocks 134 of the management area 123 is formed of a size of one logical block (which is an area where data is practically recorded in one sector and practically formed of 2048 bytes, e.g., 32 sectors correspond to 32 logical blocks). When the data is recorded on or reproduced from the volume management area 123, the logical block (management block) is employed as a minimum unit for the recording and the reproduction and as a management unit in the volume management area 123.

On the other hand, when the video data is recorded on the file extent area 124, an allocation block having a size of one logical cluster is employed as a minimum unit for the recording and the reproduction and as a management unit in the file extent area 124.

A "logical block" is a unit practically used as a data recording area in one cluster and is formed of 32 sectors, and hence the logical block corresponds to the main data area. The "allocation block" is a unit indicative of data similarly to the logical cluster. In this embodiment, a size of one logical cluster is expressed as one allocation block. Therefore, the number of clusters on a disk is agreed with the number of allocation blocks thereon. A position of every file on a disk is designated by using the allocation block number of the allocation block.

[volume descriptor]

The volume descriptor VD will be described with reference to FIG. 13. The management block at the head of the volume management area 123 shown in FIG. 12B is employed as the volume descriptor VD 125. The volume descriptor VD 125 carries out a basic management of the data track (volume) located on the disk and is formed of a header 135 where a sync. pattern and an address are recorded and a data area 137 of 2048 bytes where various management informations are recorded.

In a portion from a second byte to a sixth byte of the data area 137 of the volume descriptor VD 25, a character data 136 of "PIC_MD" as an identification information (ID) indicating that this sector is a sector of the volume descriptor VD 125 is recorded in the form of an ASCII code, for example. In the data area 137, a system version ID 142, a logical block size 143, a logical cluster size 144 and an allocation block size 145 are recorded on a portion succeeding the identification information.

Specifically, a data of byte length indicative of the practical data area in a sector of the data track is recorded as the "logical block size" 143. The sector of the data track is formed of 2352 bytes. Of 2352 bytes, 2048 bytes are allocated to the data area 137. Therefore, a value of "2048" which is a byte length of the logical block is recorded as the logical block size. This logical block is a minimum recording unit used for recording and reproducing data in the management area 123.

The number of logical blocks in the logical cluster which is a cluster where the management information and data are practically recorded is recorded in the "logical cluster size" 144. One cluster is formed of thirty six sectors. Of thirty six sectors, thirty two sectors (i.e., thirty two logical blocks) are allocated to a portion used for recording the data. Therefore, a value of "32' which is a block length of the logical cluster is recorded as the logical cluster size.

The number of logical blocs in the allocation block is recorded in the "allocation block size" 145. The allocation block also indicates a data unit similarly to the logical cluster and is a part in the data track where the management information and the data are practically recorded. For example, an area of 32 sectors as the logical cluster in the volume management area 123 and the file extent area 124 correspond to one allocation block. This allocation block is employed as a minimum recording and reproducing unit used for recording and reproducing data in the file extent area 124.

An "allocation block total number" 146 indicative of the total number of the allocation blocks in the volume is recorded at a portion succeeding the allocation block size 145. A recordable allocation block total number 147 is recorded at a portion succeeding the allocation block total number 146. In the recordable allocation block total number 147, the number of allocation blocks in the recordable area is recorded. If the mini disk is a pre-mastered disk, then a value of "0" is recorded as the allocation block total number.

An "unrecorded allocation block number" 148 is recorded at a portion succeeding the recordable allocation block total number 147. The unrecorded allocation block number 148 indicates the number of the allocation blocks which have not been recorded, of the recordable allocation blocks in the volume.

A "recorded allocation block number" 149 is recorded at a portion succeeding the unrecorded allocation block number 148. The recorded allocation block number 149 indicates the number of the allocation blocks which have been recorded, of the recordable allocation blocks in the volume.

A "defect allocation block number" 150 is recorded at a portion succeeding the recorded allocation block number 149. The defect allocation block number 150 indicates the number of the allocation blocks having defects due to scratches on the disk or the like.

A "directory number" 151 indicative of the number of directories in the volume and a "data file number" 152 indicative of the number of the data files in the volume are recorded at a portion succeeding the defect allocation block number 150.

An "ID maximum value" 153 is recorded at a portion succeeding to the directory number 151 and the data file number 152. The ID maximum value 153 indicates a maximum value of ID numbers allocated in an order of creation of the directories or the data files.

A "volume attribute" 154 is recorded at a portion succeeding the ID maximum value 153. The volume attribute 154 indicates an attribute of the data recorded in the volume management area 123 shown in FIG. 12B. For example, a volume attribute data indicative of whether or not the volume management area 123 is recorded in a mirror mode, whether or not the volume management area 123 is an invisible file (secret file), whether or not the volume management area 123 is write-protected (prohibited in writing), whether or not the volume management area 123 needs to be backed up, or the like is recorded in the volume attribute 154.

A "volume management area length" 155 is recorded at a portion succeeding the volume attribute data 154. The volume management area length 155 indicates a length of the volume management area 123, and a byte length of the volume management area 123 shown in FIG. 12B is recorded in the volume management area length 155.

A "volume management area position" 156 is recorded at a portion succeeding the volume management area length 155. The volume management area position 156 indicates a position where the volume management area 123 shown in FIG. 12B is located on the disk. In the volume management area position 156, a first allocation block number of the volume management area 123 is recorded.

Other management blocks created when the management blocks 134 of the volume management area 123 shown in FIG. 12B are recorded at portions succeeding the volume management area position 156. Specifically, as such other management blocks, a "volume space bit map position" 157 indicative of a position of a first allocation block of the volume space bit map VSB 126, a "volume space bit map number" 158 indicative of the number of the allocation blocks of the volume space bit map VSB 126, a "first management table position" 159 indicative of positions of first allocation blocks of the management tables MT 127, 128, and a "management table number" 160 indicative of the numbers of the allocation blocks of the management tables MT 127, 128 are recorded.

A "first extent record block position" 161 indicative of positions of first allocation blocks of the extent record blocks ERB 131, 133, an "extent record block number" 162 indicative of the numbers of the allocation blocks of the extent record blocks ERB 131, 133, a "first directory record block position" 163 indicative of first allocation block positions of the directory record blocks DRB 129, 130, 132, and a "directory record block number" 164 indicative of the numbers of the allocation blocks of the directory record blocks DRB 129, 130, 132 are recorded at portions succeeding the above other management blocks.

Thus, by detecting a block number of an allocation block recorded as the "first directory record block", it is possible to detect the position of the first directory.

A "root directory length" 165 indicative of a byte length of the directory and a "root directory number" 166 indicative of the subdirectory number in the directory are recorded at portions succeeding the management information block. At a portion succeeding the root directory number 166, various IDs, various character set codes and so on are recorded. As the above various IDs and various character set codes, a boot system ID, a volume ID, a publisher ID, a data preparer ID, an application ID and character set codes for the respective IDs are recorded. Other than these various IDs and the various character set codes, data indicative of time and data of volume creation, time and data of volume update, time and data of volume expiration, time and data of validity of the volume and so on are recorded.

The volume descriptor VD 125 has an EDC area 138 of 4 bytes and an ECC area 139 of 276 bytes at the portions succeeding the above-mentioned data area 137 of 2048 bytes. In the ECC area 139, P parity 140 of 172 bytes and Q parity 141 of 104 bytes based on a so-called cross-interleave system are recorded.

The data area 137 has an area of 2048 bytes. Of the data area 137 of the 2048 bytes, an area from 1024th bytes to 2047th byte of the data area 137 is used as a system extension area used for system extension.

[volume space bit map]

The volume space bit map VSB 126 will be described with reference to FIGS. 14, 15A and 15B. The management block of the block number 1 in the volume management area 123 shown in FIG. 12B is employed as the volume space bit map VSB 126. The volume space bit map VSB 126 indicates a recorded condition of the file extent area 124 by a unit of an allocation block with respect to all the allocation blocks of the data track.

Figure 14:
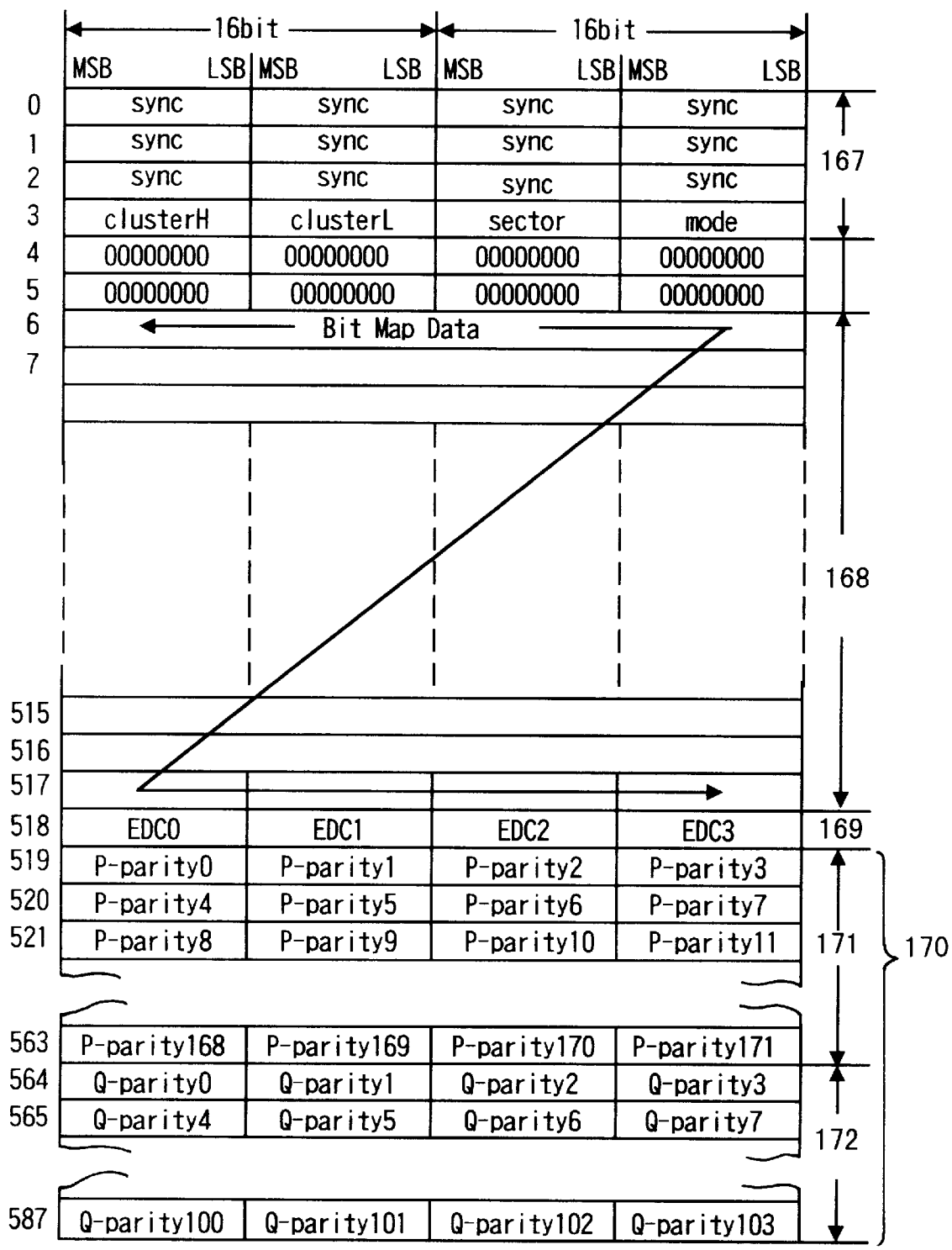
FIG. 14 is a diagram showing a sector structure of a volume space bit map VSB of the management block shown in FIGS. 12A to 12C.

As shown in FIG. 14, the volume space bit map VSB 126 is formed of a header 167 where sync. patterns (Sync) and addresses are recorded, a data area 168 of 2048 bytes, an EDC area 169 of 4 bytes, and an ECC area 170 of total 276 bytes formed of a P parity 171 of 172 bytes and a Q parity 172 of 104 bytes.

In the data area 168, the allocation blocks and types of the allocation blocks are recorded.

Figure 15A:
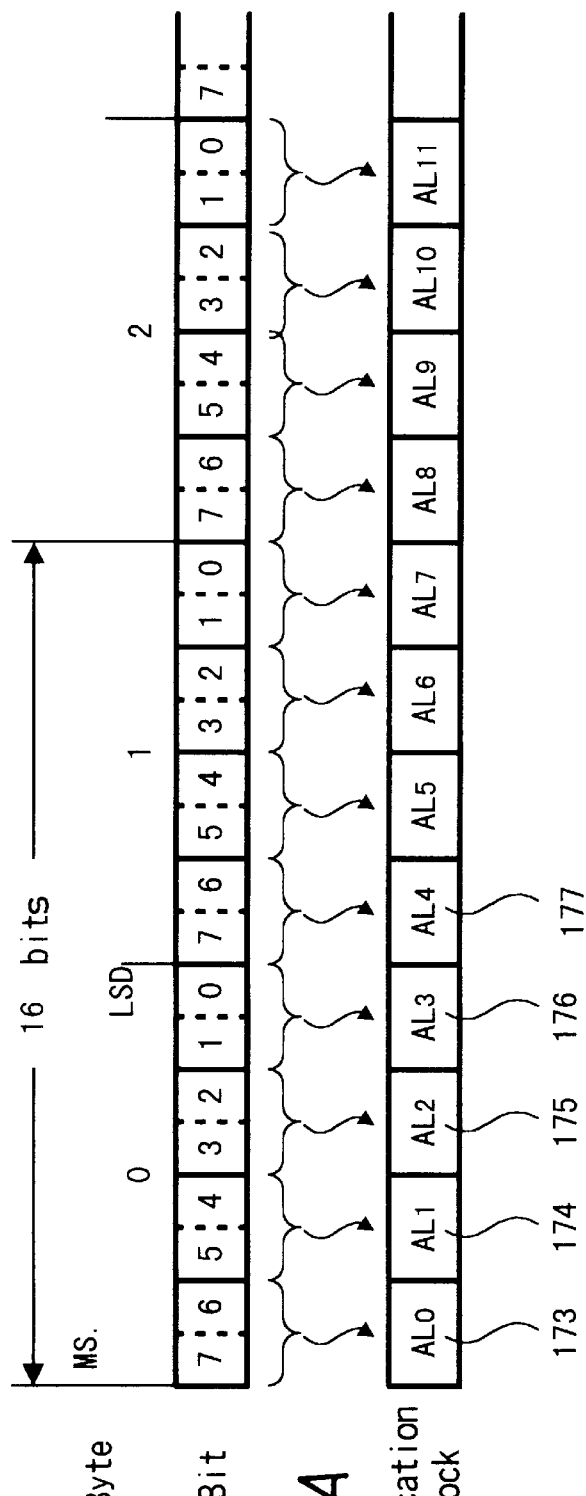
FIGS. 15A and 15B are diagrams showing an arrangement of an allocation block used in the picture synthesizing apparatus according to this embodiment.
Figure 15B:
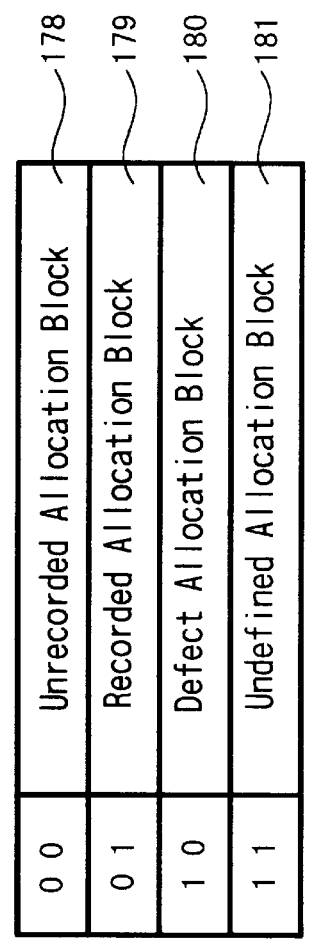

Specifically, as shown in FIG. 15A, allocation block numbers $AL_0$, $AL_1$, $AL_2$, . . . are respectively allocated to allocation blocks in the data track in an order of the allocation block numbers 0, 1, 2, . . . of the allocation blocks. A seventh bit and a sixth bit of a 0th byte which is a first byte of the data area 168 of the volume space bit map VSB 126 are allocated to the allocation block "$AL_0$" 173 of the number 0. A fifth bit and a fourth bit of the 0th byte which is the first byte of the data area 168 are allocated to the allocation block "$AL_1$" 174 of the number 1. A third bit and a second bit of the 0th byte which is the first byte of the data area 168 are allocated to the allocation block "$AL_2$" 175 of the number 2. A first bit and a 0th bit of the 0th byte which is the first byte of the data area 168 are allocated to the allocation block "$AL_3$" 176 of the number 3. A seventh bit and a sixth bit of the first byte thereof are allocated to the allocation block "$AL_4$" 177 of the number 4. Thus, 2 bits are allocated to each of the allocation blocks.

Information of 2 bits allocated to each of the allocation blocks indicates a type of each of the allocation blocks. As shown in FIG. 15B, if the allocation block is the unrecorded allocation block 178, then the information of "00" is recorded in the corresponding bits of the data area 168. If the allocation block is the recorded allocation block 179, information of "01" is recorded in the corresponding bits of the data area 168. If the allocation block is the defect allocation block 180, then information of "10" is recorded in the corresponding bits of the data area 168. If the allocation block is an undefined allocation block 181, then information of "11" is recorded in the corresponding bits of the data area 168.

Information of "11" is recorded in each of the 2-bit portions of the remaining area of the data area 168, i.e., an area thereof where the corresponding allocation block is not provided.

The mini disk has a data area of an mount of 2200 clusters, and such informations can be recorded in the allocation blocs $AL_0$ to $AL_{8191}$. However, practically, of the allocation blocks $AL_0$ to $AL_{8191}$, the allocation blocks $AL_0$ to $AL_{2199}$ are used to record informations therein.

[management table]

The management tables MT 127, 128 will be described with reference to FIG. 16 and FIGS. 17A to 17H. The management blocks of the block numbers 2 and 3 in the volume management area 123 shown in FIG. 12B are employed as the management tables MT 127, 128.

Figure 16:
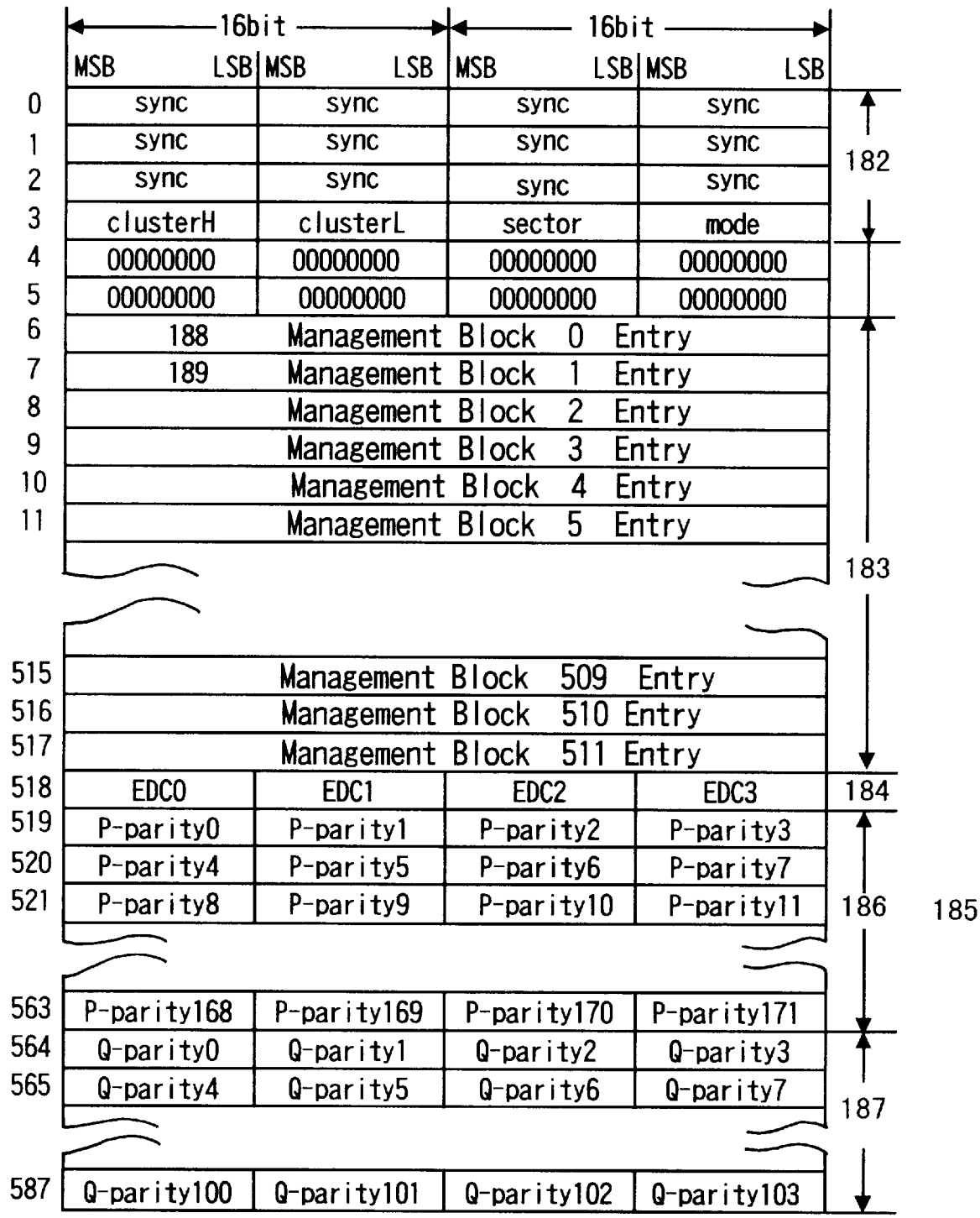
FIG. 16 is a diagram showing a sector structure of a management table MT of the management block shown in FIGS. 12A to 12C.

The management tables MT 127, 128 respectively indicate used states of management blocks in the volume management area 123. As shown in FIG. 16, each of the management tables MT 127, 128 is formed of a header 182 where sync. patterns and addresses are recorded, a data area 183 of 2048 bytes, an EDC area 184 of 4 bytes, and an ECC area 185 of 276 bytes formed of a P parity 186 of 172 bytes and a Q parity 187 of 104 bytes.

In the data area 183 of 2048 bytes, management block 0 to 511 entries to each of which 4 bytes are allocated are recorded. Thus, the used states of the 512 management blocks of the volume management area 123 are managed.

Contents of data concerning the management blocks of respective 0 to 511 entries each having 4 bytes are as follows.

Figure 17A:
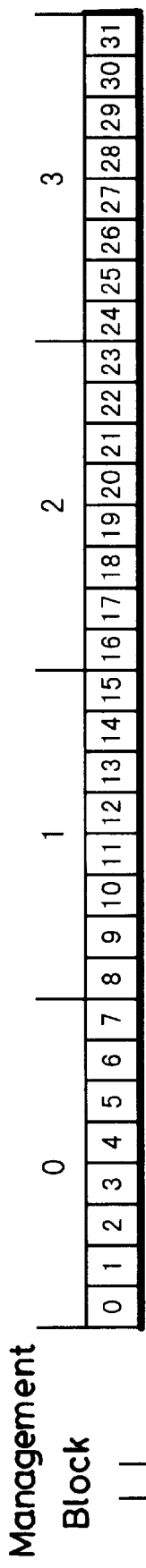

As shown in FIG. 17A, the first management block (management block 0 entry 188) is employed as the volume descriptor VD 125. In the management block 0 entry 188, a portion from a 0th byte to a second byte are set as a reserve 190. In a third byte, data of "80h", for example, is recorded as an entry type 191 indicating that the management block 0 entry is the volume descriptor.

Figure 17B:

As shown in FIG. 17B, the second management block (management block 1 entry 189) is employed as the volume space bit map VSB 126. In the management block 1 entry 189, an unrecorded allocation block number 192 is recorded in a portion from a 0th byte to a first byte. A second byte is set to a reserve 193. In a third byte, data of "90h", for example, is recorded as an entry type 194 indicating that the management block 1 entry 189 is the volume descriptor.

Figure 17C:

As shown in FIG. 17C, the third and fourth management blocks are respectively employed as the management tables MT 127, 128. In each of the above management blocks, a management table position 195 is recorded in a portion from a 0th byte to a first byte. An unrecorded management block number 196 is recorded in a second byte. In a third byte, data of "A0h", for example, is recorded as an entry type 197 indicating that the management block is the management table.

Figure 17D:

As shown in FIG. 17D, in a management block employed as the extent record block, a next extent record block position 198 is recorded in a portion from a 0th byte to a first byte. An unused extent record block number 199 is recorded in a second byte. In a third byte, data of "B0h", for example, is recorded as an entry type 200 indicating that the management block is the extent record block.

The directory record block includes a "single directory record block" used when a directory record unit forming one directory is recorded by using only one management block and "plural directory record blocks" used when a directory record unit forming one directory is divided into plural parts and then recorded in a plurality of directory record blocks which are a plurality of management blocks.

When the management block is used as the single directory record block, as shown in FIG. 17E, a directory ID 201 is recorded in a portion from a 0th bit to a 29th bit. In the last two bits (i.e., a 30th bit and a 31st bit), data of "00h", for example, is recorded as an entry type 202 indicating that the management block is the single directory record block.

When the management blocks are used as the plural directory record blocks, informations are recorded as shown in FIGS. 17F to 17H.

Specifically, if the management block is "an initial directory record block (the first directory record block)" of the plural directory record blocks, then, as shown in FIG. 17F, a next directory record block position 203 is recorded in a portion from a 0th byte to a first byte. In a second byte, a higher-order byte 204 of a directory ID is recorded. In a third byte, data of "D0h" is recorded as an entry type 205 indicating that the management block is the first directory record block.

If the management block is "the last directory record block" of the plural directory record blocks, then, as shown in FIG. 17H, a lower-order byte 209 of a directory ID is recorded in a portion from a 0th byte to a second byte. In a third byte, data of "F0h" is recorded as an entry type 210 indicating that the management block is the last directory record block.

If the management block is one of "the middle directory record blocks" of the plural directory record blocks (i.e., if the management block is one of the directory record blocks other than the first directory record block and the last directory record block mentioned above), then, as shown in FIG. 17G, a next directory record block position 206 is recorded in a portion from a 0th byte to a first byte. A second byte is set as a reserve 207. In a third byte, data of "E0h" is recorded as an entry type 208 indicating that the management block is the middle directory record block.

[directory record block]

The directory record block will be described with reference to FIGS. 18 and 19. The management blocks of the number 3 or greater of the volume management area 123 shown in FIG. 12B are employed as the "directory record blocks DRB" 129, 130, 131, for example. In the directory record blocks DRB 129, 130, 131, one or plurality of directory record units are recorded.

The directory record unit includes a "directory DR unit" 230 used for forming a directory and a "file DR unit" 253 corresponding to a certain data file and used for designating a position of the data file. In the directory record block, the directory DR unit 230 and the file DR unit 253 are mixedly recorded in response to a file and a subdirectory made in the directory.

Figure 18:
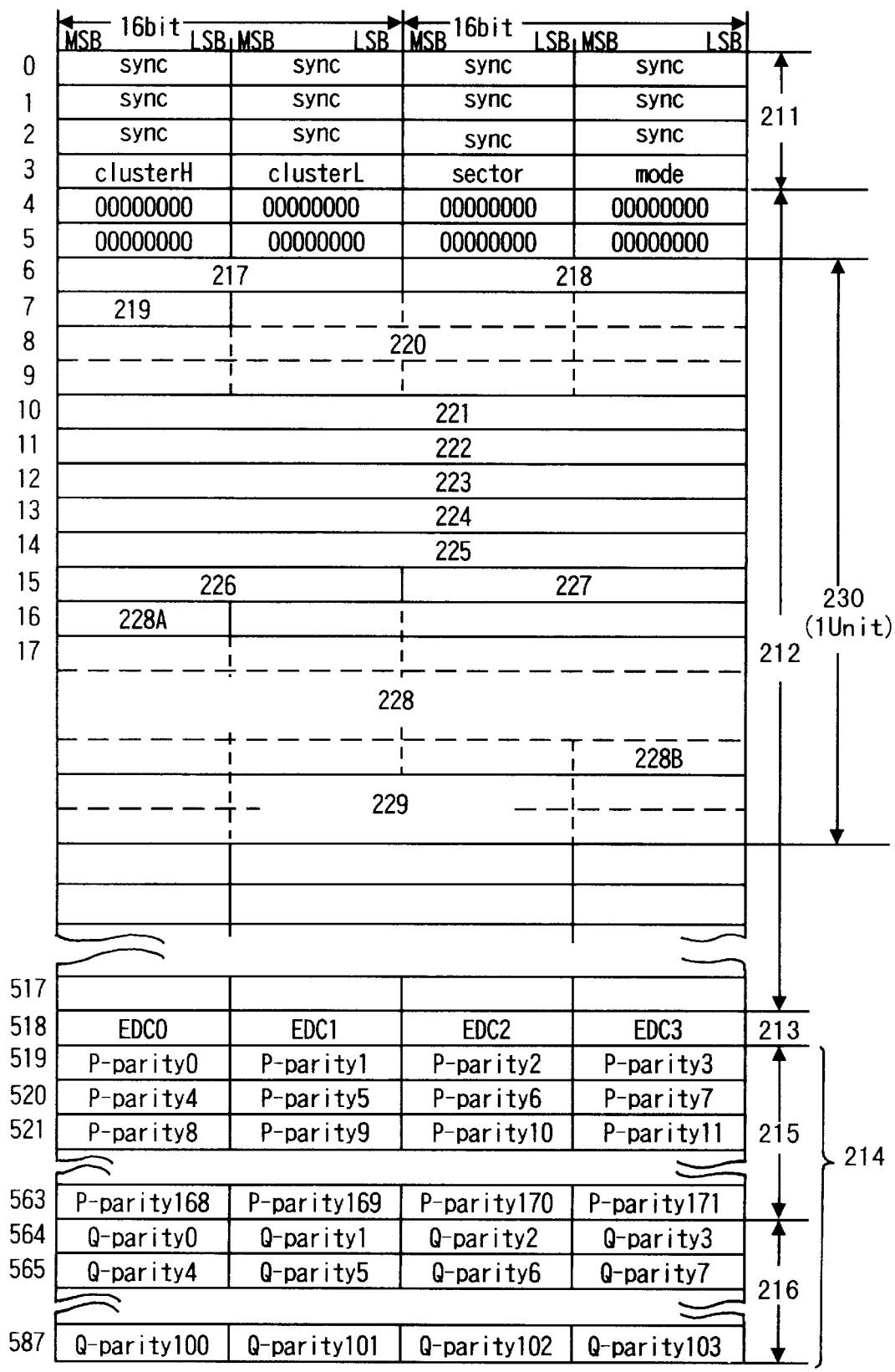
FIG. 18 is a diagram showing a sector structure of a directory record block DRB having a directory DR unit of the management block shown in FIGS. 12A to 12C.

The directory record block DRB where the directory DR unit 230 for forming the directory is recorded, as shown in FIG. 18, includes a header 211 where sync. patterns and addresses are recorded, a data area 212 of 2048 bytes, an EDC area 213 of 4 bytes, and an ECC area 214 of 276 bytes formed of a P parity 215 of 172 bytes and a Q parity 216 of 104 bytes.

In the one directory DR unit 230, a directory record length 217 indicative of a byte length of the directory record unit is recorded at the head part thereof. The directory record length 217 of the one directory record unit is set as a variable length.

A directory attribute 218 is recorded at a portion succeeding the directory record length 217. Specifically, as the directory attribute 218, informations indicative of whether or not the directory record unit is a directory record unit for the directory, whether or not the directory including the directory record unit is an invisible directory, whether or not the directory is a system directory, and so on are recorded. Thus, the directory attribute 218 indicates whether or not the data file position is indicated by the extent record block which will be described later on.

A character set code (CSC) 219 indicative of a character type of a short name ID and a short name ID 220 are recorded at portions succeeding the directory attribute 218. The short name ID is recorded in the form of the ASCII code of 11 bytes, and hence a directory name containing eleven characters or less can be recorded in the short name ID 220.

A directory creation time and date 221 and a directory update time and date 222 are recorded at portions succeeding the short name ID 220. A status update time and date 223 is recorded at a portion succeeding the directory update time and date 222, and hence update time and date of the directory record unit are recorded in the status update time and date 223. A directory ID number 224 and a directory length 225 are recorded at portions succeeding the status update time and date 223. An "index to DRB" 226 and a "number of DRB" 227 are recorded at portions succeeding the directory length 225.

The index-to-DRB 226 indicates a position in the volume management area 123 shown in FIG. 12B, of the first directory record block DRB of the directory record blocks DRB where contents of a designated subdirectory are recorded. THerefore, in the index-to-DRB 226, any of the values corresponding to the management numbers 0 to 511 is recorded.

In the number-or-DRB 227, the number of the directory record blocks used for indicating the designated directory is recorded by using the number of the management blocks.

A "long name ID" 228 is recorded at a portion succeeding the number-or-DRB 227. The long name ID 228 has a variable length, and hence a data length 228A thereof is recorded therein. The long name ID 228 is sometimes not recorded. In this case, data of "00h" is recorded as the long name ID 228. If the long name ID 228 has a data of even number bytes, then data of "00h" is recorded as a padding 228B used for occupying a remaining byte. A portion succeeding the long name ID 228 is used as a system extension area 229.

The directory record unit corresponding to the directory is formed as described above. A plurality of directory record units are provided in the data area 212 of 2048 bytes.

Figure 19:
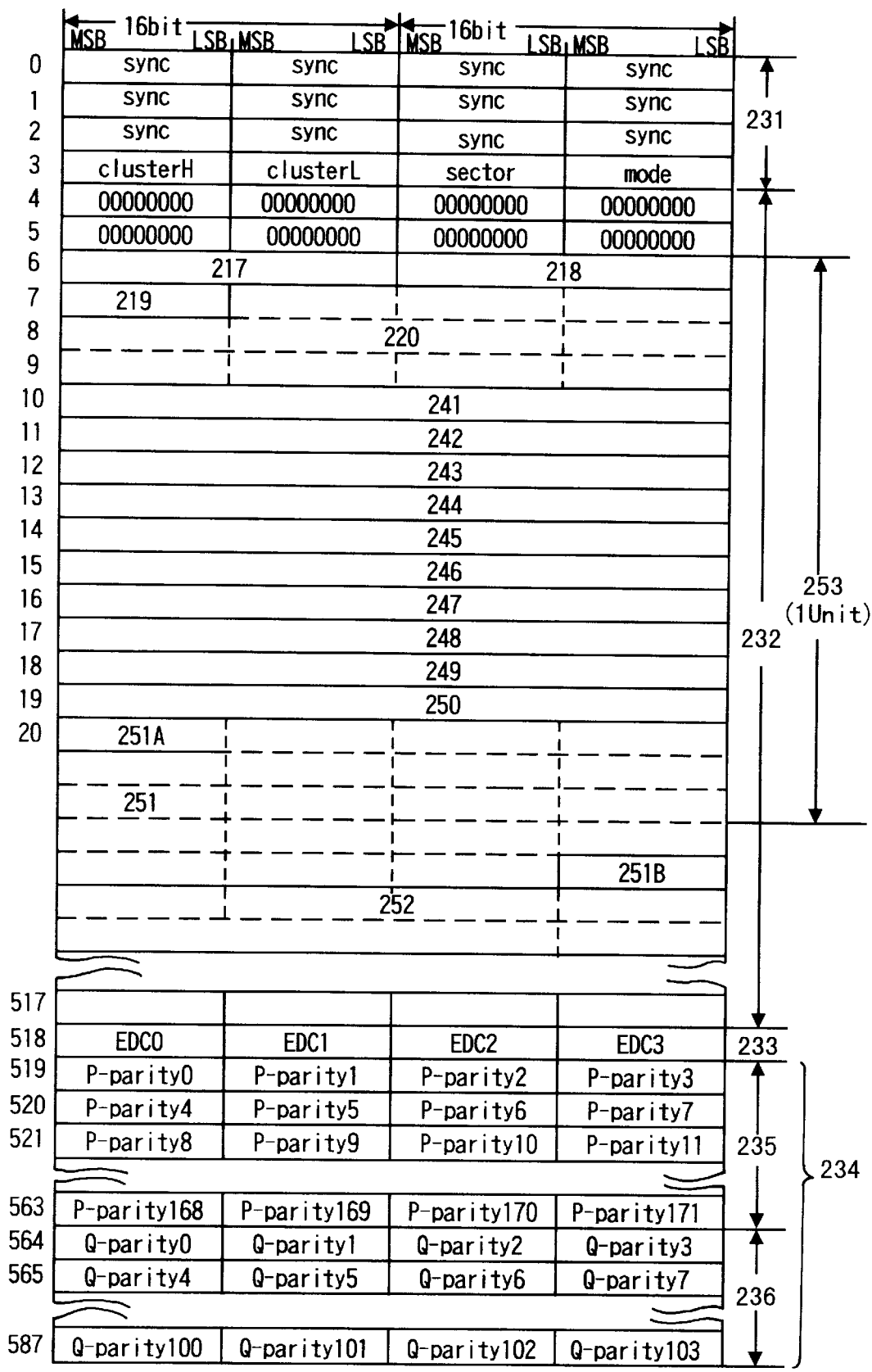
FIG. 19 is a diagram showing a sector structure of the directory record block DRB having a file DR unit of the management block shown in FIGS. 12A to 12C.

The directory record block DRB where the file DR unit corresponding to a certain data file is recorded, as shown in FIG. 19, is formed of a header 231 where sync. patterns and addresses are recorded, a data area 232 of 2048 bytes, an EDC area 233 of 4 bytes, and an ECC area 234 of 276 bytes formed of a P parity 235 of 172 bytes and a Q parity 236 of 104 bytes.

In the data area 232 of 2048 bytes, one or a plurality of directory record units corresponding to the data files can be recorded.

Similarly to the directory record block DRB shown in FIG. 18, in the file DR unit 253, a directory record length 237 is recorded at the head thereof, and an attribute 238 is recorded at a portion succeeding the directory record length 237. The attribute 238 indicates various attributes indicative that the directory record unit does not corresponding to the directory, that the corresponding data file is an invisible data file, that the corresponding data file is a system file, that the data file position thereof is designated by the extent record unit, and so on.

At a portion succeeding the attribute 238, similarly to the directory record unit shown in FIG. 18, a character set code (CSC) 239, a short name ID 240 used for recording a file name, a directory creation time and date 241, a directory update time and date 242, a status update time and date 243, a data file ID number 244, and a data file length 245 are recorded.

An extent start location 246 recorded at a portion succeeding the data file length 245 indicates a file position recorded in the file extent area 124 shown in FIG. 12B by using the allocation block number. A number-of-block 247 recorded at a portion succeeding the extent start location 246 indicates the number of the allocation blocks used from a start position designated by the extent start location 246. An associate data length 248 is recorded at a portion succeeding the number-or-block 247.

An "index-to-ERB" 249 recorded at a portion succeeding the associate data length 248 indicates a position in the volume management area 123 shown in FIG. 12B of the extent record blocks including the data indicative of dispersed positions of the data dispersively recorded. The Index-to-ERB 249 is recorded by using the number of the management bloc numbers 0 to 511.

A "number-of-ERB" 250 recorded at a portion succeeding the index-to-ERB 249 indicates the number of the extent record blocks indicative of the dispersively recorded data file, a nd is recorded by using the management block numbers.

A long name length 251A which is a variable length is recorded at a portion succeeding the number-or-ERB 250. If the long name length 251A is not recorded, then data of "00h" is recorded as a long name ID 251 recorded at a portion succeeding the long name length 251A. If the long name ID 251 has bytes of even number, then data of "00h" is recorded as a padding 251B used for occupying a remaining byte. A portion or byte succeeding the long name ID 251 is used as a system extension area 252.

The file DR unit corresponding to the data file is arranged as described above, and a plurality of file DR units are provided in the data area 232 of 2048 bytes.

When the data file such as a picture file or the like is recorded on the mini disk 25, there can be employed the following two methods in which methods of designating the data file position are different from each other.

The first method is employed when continuous empty areas having an amount of data of the picture file to be recorded can be secured on the disk. In this case, the picture file is recorded as one file on physically continuous areas. Specifically, the one picture file is recorded so as to be formed of continuous allocation blocks. Usually, the one picture file is recorded in the physically continuous areas, and a position of the data file, i.e., the picture file is indicated by using the allocation block number recorded as the extent start location 246 in the file DR unit 253.

The second method is employed when continuous empty areas having an amount of data of the picture file to be recorded cannot be secured on the disk. In this case, the one picture file is divided into parts and then the divided parts are dispersively recorded in dispersed areas on the disk. Specifically, the one picture file is recorded so as to be formed of a plurality of allocation blocks dispersed on the disk. In this case, the position of the extent record block, which will be described later on, in the management area 123 is designated by using the management block number recorded as the index-to-ERB 249 included in the file DR unit 253. Thus, it is possible to designate the position of the respective dispersed areas based on the data included in the extent record block.

In the first method, data of the index-to-ERB 249 is not recorded. In the second method, data of the extent start location 246 is not recorded.

[extent record block]

The extent record block will be described with reference to FIG. 20. The management blocks having the block number 4 or greater in the volume management area 123 shown in FIG. 12B are employed as the extent record blocks ERB 131, 133. The extent record blocks ERB 131, 133 are used when one picture file is recorded on dispersed areas designated by the dispersed allocation blocks as described in the second method. In the extent record block ERB, there are recorded data indicative of positions of allocation blocks of respective dispersed areas.

Sixty-four extent record units (ER units) at most can be recorded in the extent record block ERB.

The ER unit is formed of a n index ER unit 266 of 32 bytes and a descriptor ER unit of 32 bytes.

The index ER unit 266 is recorded a s a first unit of a plurality of ER units in the extent record block ERB, thereby managing used states of the second ER unit and the succeeding ER units. The second ER unit and the succeeding ER units are employed as the descriptor ER unit 267. By using the data included in the descriptor ER unit 267, the recorded positions of the respective dispersed areas are indicated by using the allocation block number.

Figure 20:
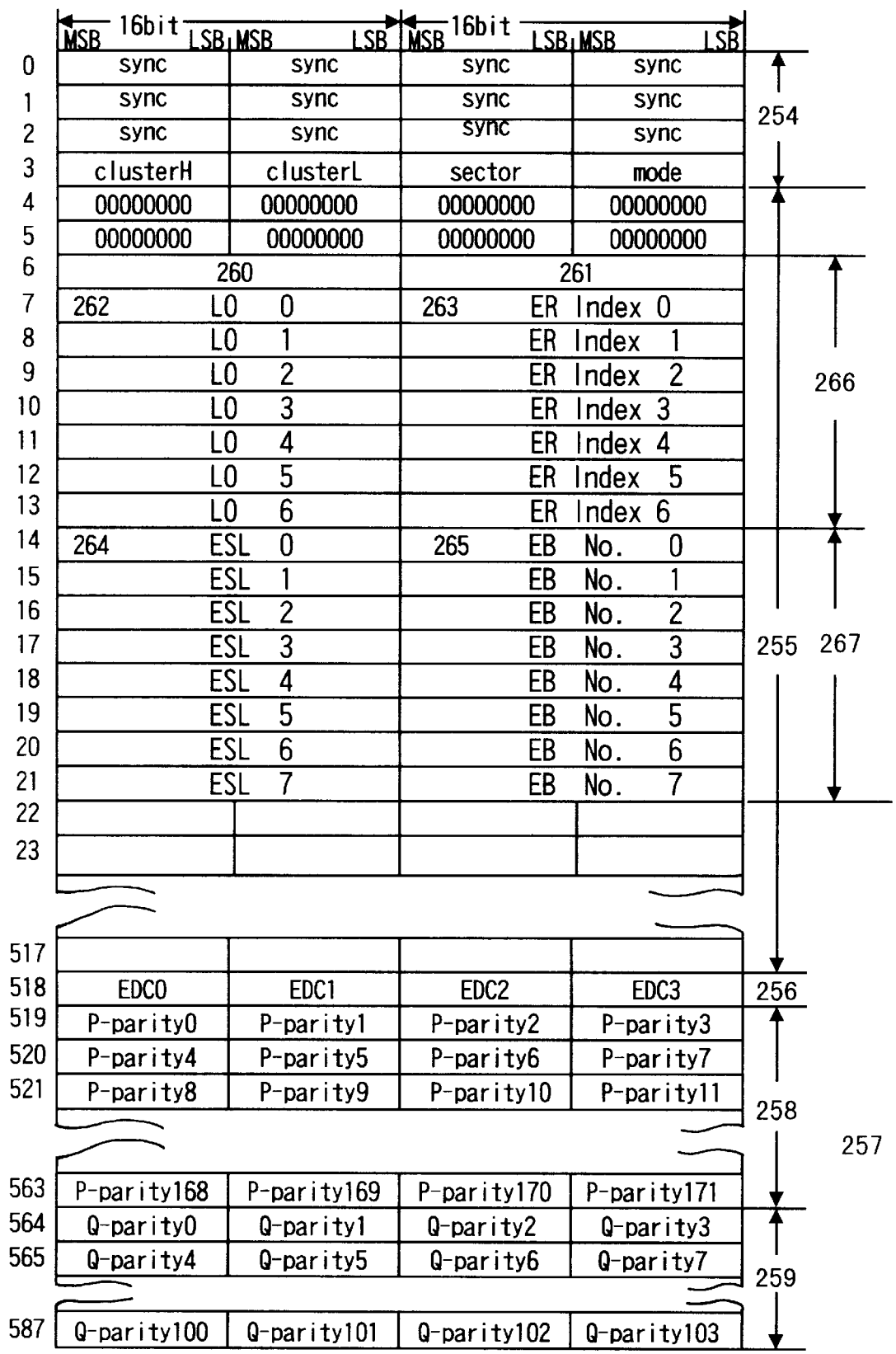
FIG. 20 is a diagram showing a sector structure of an extent record block ERB of the management block shown in FIGS. 12A to 12C.

Specifically, as shown in FIG. 20, the extent record block ERB is formed of a header 254 where sync. patterns and addresses are recorded, a data area 255 of 2048 bytes, an EDC area 256 of 4 bytes, and an ECC area 257 of 276 bytes formed of a P parity of 172 bytes and a Q parity of 104 bytes.

In the data area 255 of 2048 bytes, sixty-four extent record units (ER units) can be recorded. One extent record unit is formed of 32 bytes.

FIG. 20 is a diagram showing an example of an extent record block in which a first record unit of thirty-tow bytes of the data area 255 is used as the index ER unit 266.

In the index ER unit 266, an index ID 260 is recorded at the head thereof. In this case, data of "FFFF" indicating that the extent record unit is used as the index ER unit is recorded as the index ID 260.

A maximum depth 261 is recorded at a portion succeeding the index ID 260. The index ER unit 266 is used to form a tree structure of the extent records, and the maximum depth 261 indicates a sub tree hierarchy designated by the index ER unit 266. For example, if the extent record unit including the extent descriptor is designated by the index ER unit 266 (the extent record unit is located in the lowermost level), data of "000h" is recorded as the maximum depth 261. Portions succeeding the maximum depth 261, seven logical offsets 262 and seven ER indexes 263 can be recorded at most.

The ER index 263 indicates which ER unit of the sixty-four ER units recorded in the extent record block is a data indicative of the dispersed areas. Corresponding one of the ER unit numbers 0 to 63 is recorded in the ER index 263. In the logical offset (LO) 262, data indicative of the ER unit of which number in the ER units forming the data file the ER unit indicated by the ER index 263 corresponds to is recorded.

As shown in FIG. 20, the second ER unit and the succeeding ER units are employed as the descriptor ER units 267.

In the descriptor ER unit 267, eight extent start locations (ESL) 264 and eight extent block numbers (EB No.) 265 indicative of the allocation block number at most are recorded.

The allocation block number indicative of the recorded position of one of the dispersed areas is recorded as the extent start location 264. Data indicative of the number of the allocation blocks forming the dispersed areas is recorded as the extent block number 265 indicative of the allocation block number. Thus, with the one extent start location 264 and the one extent block number 265 indicative of the allocation block number, one of the dispersed areas is designated. Therefore, since in the one descriptor ER unit 267 the eight extent start locations 264 and the eight extent block numbers 265 indicative of the allocation block numbers can be recorded, eight dispersed areas at most can be designated with the one descriptor ER unit 267.

If the dispersed areas of the number exceeding eight are designated, then the third ER unit is newly employed as the descriptor ER unit 267. By using the index ER unit 266, the descriptor ER unit succeeding the descriptor ER unit 267 recorded in the second ER unit may be linked with the descriptor ER unit newly recorded in the third ER unit.

There will be described how to designate positions of the picture file recorded on a plurality of dispersed areas by using the extent record block ERB as described above.

A position of the extent record block ERB in the management block area is designated by the index-to-ERB 249 recorded in the file DR unit 253 of the directory record block DRB. At the head of a first ER unit of the extent record block ERB, there is recorded data of "FFFF" indicating that this extent record unit is used as the index extent record unit. Therefore, when this extent record block ERB is reproduced, it is possible to determine that the first ER unit thereof is the index ER unit 266.

In order to detect a first one of the ER units forming the data file, data of the ER index corresponding to data of "0000" in the logical offset 262 is detected. As described above, each of the eight dispersed areas can be designated by the eight extent start locations 264 and the extent block numbers 265 indicative of the allocation block numbers recorded in the descriptor ER units 267 indicated by data of the ER index. Therefore, each of the picture files dispersed on the mini disk 25 can be detected with the data in the management area. Accordingly, it is not required to detect the mini disk 25 when the picture file is read out, which enables a high-speed reproduction.

[explanation of file and its hierarchical structure]

A file and its hierarchical structure will be described with reference to FIGS. 21 to 23. Files used in the still picture control apparatus includes a management file, a picture file, an index file and so on.

A filename extension of a management file is "PMF". By detecting a "PMF" extension, it is possible to identify that the file having the "PMF" file name extension is the management file. The management file includes an overall information management file (OV_INF.PMF), a video data management file (PIC_INF.PMF), a print data management file (PRT_INF. PMF), a reproduction control management file (PMS_INF. PMF) and so on.

A filename extension of every picture file is "PMP". By detecting a "PMP" filename extension, it is possible to identify that the file having the "PMP" file name extension is the picture file. The picture file includes a high-resolution picture file for recording a high-resolution video data HD and a middle-resolution picture file for recording a middle-resolution video data SD.

The middle-resolution picture file includes a PSNnnnnn. PMP" file having a video data of an aspect ratio of 4:3 and a size of 640 pixels×480 pixels and a "PSWnnnnn. PMP" file having a video data of an aspect ratio of 16:9 and a size of 848 pixels×480 pixels.

The high-resolution picture file includes a "PHPnnnnn. PMP" file having a video data of an aspect ratio of 3:2 and a size of 1536 pixels×1024 pixels and a "PHWnnnnn. PMP" file having a video data of an aspect ratio of 16:9 and a size of 1920 pixels×1080 pixels. An ultrahigh-resolution picture file UD which is one of the high-resolution picture files includes a "PUPnnnnn. PMP" file having a video data of an aspect ratio of 3:2 and a size of 3072 pixels×2048 pixels and a "PHWnnnnn. PMP" file having a video data of an aspect ratio of 16:9 and a size of 1920 pixels×1080 pixels.

First three characters (e.g., PHP or the like) of a filename of the picture file having a "PMP" extension are determined depending upon a kind of the picture, and the succeeding five characters (nnnnn) thereof are determined depending upon a picture number allocated in an order of generation of a picture file.

The still picture control apparatus manages the video data recorded on the mini disk 25 by using a hierarchical directory structure. In the hierarchical directory structure, as shown in FIG. 21, a directory D1 (PIC_MD) is provided, and files are managed in the directory PIC_MD.

In the directory D1, an overall information management file f1 (OV_INF. PMF) for managing the overall informations, an overall index file f2 (OV_IDX. PMX) for recording representative index files of respective albums, and picture directories D2 to D4 (PIC00000 to PIC00002) of the respective albums are provided.

In this embodiment, as the picture directories, the respective picture directories (PIC00000) to (PIC00002) having the directory numbers "00000" to "00002" are provided. Five characters succeeding "PIC" of the picture directory name are given as a directory number in an order of generation of the picture directory. Thus, the picture directory name can be indicated. The respective picture directories (PIC00000) to (Pic0002) form subdirectories of the directory D1.

The directory D1 (PIC_MD) also includes a print directory (PRINT) used for managing a print control data such as a print tint, a print size, a rotation or the like, a telop file (TELOP. PMO) used for managing telops such as a tile of a picture displayed on a monitor or the like, a keyword retrieval file (KW_DTBS. PMO) used for retrieving picture numbers of the respective pictures and key words added to the respective pictures, a time stamp file (TS_DTBS. PMO) used for managing recording date and time of a picture or the like, and a reproduction control directory (PMSEQ) used for managing a program reproduction such as reproduction of only designated pictures.

In the picture directory D2 (PIC00000), a picture data management file f3 (PIC_INF. PMF) used for managing a plurality of picture files designated by the directory number "00000" and a picture index file f4 (PIDX000. PMX) including all the index pictures in the picture directory D2 are recorded. In the picture directory D2, a middle-resolution picture file f5 (PSN00000. PMP) and a high-resolution picture file f6 (PHP00000. PMP) both of which are generated based on the video data designated by the picture number "00000" are recorded. A middle-resolution picture file f7 (PSN00001. PMP) and a ultrahigh-resolution picture file f9 (PUP00001. PMP) both of which are generated based on the video data designated by the picture number "00001" are also recorded in the picture directory D2. A middle-resolution picture file f10 (PSN0002. PMP) generated based on the video data designated by the picture number "00002" and a middle-resolution picture file f11 (PSN0003. PMP) generated based on the video data designated by the picture number "00003" are further recorded therein.

In a picture directory D3 (PIC00001) designated by a directory number "00001", a video data management file f12 (PIC_INF. PMF) similar to the video data management file f3 (PIC_INF. PMF) in the picture directory D2 and tow index files f13, f14 (PIDX000. PMX and PIDX001. PMX) are recorded. The two picture index files f13, f14 are used to manage index pictures corresponding to picture files recorded in the picture directory D3 (PIC00001). Formally, the two index files f13, f14 are employed with being linked with each other.

In the print directory (PRINT), a print data management file f17 (PRT_INF. PMF) used for managing a plurality of print data and print data files f18, f19 (PRT000. PMO and PRTnnn. PMO) managed by the print data management file are recorded.

In the reproduction control directory (PMSEQ), there are recorded a reproduction control management file (PMS_INF. PMF) used for managing a reproduction control data file recorded in the reproduction control directory (PMSEQ) and a plurality of reproduction control data files (PMS000. PMO to PMSnnn. PMO) used for controlling a picture sequence are recorded.

As described with reference to FIG. 12C, the management blocks 134 are marked with the block numbers 0 to 1023. The management blocks are employed as the volume descriptor VD 125, the volume space bit map VSB 126, the management table MT 127, the management table MT 128, the directory record block DRB 129, the directory record block DRB 130, the extent record block ERB 131, the directory record block DRB 132, the extent record block ERB 133, . . . arranged in an ascending order of the block number 0.

Based on the data of the volume descriptor VD 125, it can be determined that the first directory record block DRB 129 is the fourth management block of the management block 134. In FIG. 22, in the directory record block DRB 129 recorded in the fourth management block of the management block 134 shown in FIG. 12C, two file DR units 268, 269 are provided at portions succeeding a header. The file DR units 268, 269 are units indicative of positions of the files f1 and f2 shown in FIG. 21.

Specifically, in the file DR unit 268 recorded in the first unit of the directory record block DRB 129, an allocation block position of the file f1 is indicated by an allocation block number recorded as a "data file position (extent start location 246)". Similarly, in the file DR unit 269 recorded in the second unit thereof, an allocation block position of the file f2 is indicated by an allocation block number recorded as a "data file position (extent start location 246)". No data of index-to-ERB 249 is recorded in "associate data positions (index-to-ERBs 249) because the file DR units 268, 269 are recorded in continuous allocation blocks on the mini disk 25.

At portions succeeding the two file DR units 268, 269, i.e., third and fourth units, two directory DR units 270, 271 are provided. The two directory DR units 270, 271 are units indicative of positions of the directories. Specifically, in the directory DR units 270, 271, a relative block position, in the management block 134, of the directory record block DRB corresponding to the directory is indicated by the block number recorded as a "first directory block position (index-to-DRB 226)". In this embodiment, data of "005" indicative of a block position in the management block of the directory record block DRB of the directory D2 is recorded as data of the "first directory block position (index-to-DRB 226)" in the third directory DR unit 270 in the third unit. Similarly, as the data of the "first directory block position (index-to-DRB 226)" of the fourth directory DR unit 271, data of "007" indicative of the block position in the management block of the directory record block DRB of the directory D3 is recorded.

As described above, a block position of the directory record block 130 at the fifth management block of the management block 134 shown in FIG. 12C is designated by the directory DR unit 270 which is the third unit of the directory record block DRB 129 located at the fourth management block of the management block 134. The directory record block DRB 130 located at the fifth block is a block where data concerning the directory D2 is recorded. In the Directory record block 130, eight file DR units 272 to 279 are provided at an area succeeding a header.

Data indicative of positions of the files f3 to f8 are respectively recorded in the six file DR units 272 to 277 provided in the first to sixth units of the directory record block DRB 130. Similarly to the file DR units 268 and 269, allocation block positions of the files f3 to f8 are respectively indicated by allocation numbers recorded as "data file positions (extent start locations 246)".

In the file DR unit 278 provided in the seventh unit of the directory record block DRB 130, data indicative of a position of the file f9 is recorded. The file f9 is a high-resolution picture file, and hence an area of eighteen cluster amount is required to record this high-resolution video data. However, when the data is recorded, continuous area of eighteen clusters cannot be secured on the mini disk 25 and hence the high-resolution video data is inevitably recorded on dispersed areas of the mini disk 25. When one file is recorded on dispersed areas as described above, positions of the respective dispersed areas of the file are not designated directly by the data of the file DR unit 278. In this embodiment, the extent record block ERB 131 is interposed between the directory record block DRB 130 and the file f9, thereby the respective positions of the dispersed area of the file f9 being designated by the data of the extent record block ERB 131.

As described with reference to FIG. 20, in the extent record block ERB 131, four extent record (ER) units are provided at an area succeeding the header (in the extent record block, sixty-four ER units can be provided at most). A first ER unit of the extent record block 13 is employed as an index ER unit 280. Second and third ER units are employed descriptor ER units 281, 282, respectively.

In the index ER unit 280, index data concerning the second ER unit and the succeeding ER units are recorded. In the index ER unit 280, Er indexes (offset of ER) and logical offsets which are as many as the ER units are recorded. The ER index is a data indicating which ER unit of the sixty-four ER units exists and indicated by ER unit numbers of 0 to 63. The logical offset is a data indicative of the ER unit of which number in the ER units forming the one file the ER unit indicated by the ER index corresponds to.

In each of the descriptor ER units (ERDESC) 281, 282, eight extent start positions (extent start locations 264) and eight extent block numbers (number of blocks 265) can be recorded. The extent start position (extent start location 264) is the data indicative of a start position of a dispersed area and expressed by using the allocation number. The extent block number (number of blocks 265) is a data indicative of a data length of a dispersed area and expressed by using the number of allocation blocks. Therefore, by using one descriptor ER unit, it is possible to designate eight dispersed areas based on the extent start positions (extent start locations) and extent block numbers (numbers of blocks).

Similarly, a block position of the directory record block DRB 132 located at the seventh block of the management block 134 shown in FIG. 12C is designated by the directory DR unit 271 at the fourth unit of the directory record block DRB 129 of the management block 134. The directory record block DRB 132 at the seventh block of the management block 134 is a block where data concerning the directory D3 are recorded. In the directory record block DRb 132, five file ER units 283 to 287 are recorded at an area succeeding a header.

Data indicative of positions of files f11 to f14 are respectively recorded in the four file DR units 283 to 286 provided in the first to fourth units of the directory record block DRB 132. Similarly to the above file DR units 272 to 277, in the file DR units 283 to 286, allocation block positions of the files f11 to f14 are respectively indicated by using the allocation block numbers recorded as the "data file positions (extent start locations 246)".

In the file DR unit 287 provided at the fifth unit of the directory record block DRB 132, data indicative of a position of the file f15 is recorded. The file f15 is a high-resolution picture file, and hence an area of eighteen cluster amount is required to record this high-resolution video data. However, when the data is recorded, continuous area of eighteen clusters cannot be secured on the mini disk 25 and hence the high-resolution video data is inevitably recorded on dispersed areas. When one file is recorded on dispersed areas as described above, positions of the respective dispersed areas of the file is not designated directly by the data of the file DR unit 287. In this embodiment, the extent record block ERB 133 is interposed between the directory record block DRB 132 and the file f15, thereby the respective positions of the dispersed area of the file f15 being designated by the data of the extent record block ERB 133.

A first ER unit of the extent record block ERB 133 is employed as an index ER unit 288, and a second ER unit thereof is employed as a descriptor ER unit 289.

In the index ER unit 288, index data concerning the second ER unit and the succeeding ER units is recorded. In the index ER unit 288, ER indexes (offsets of ER) and logical offsets (logical offsets 262 which are as many as ER units are recorded.

In the descriptor ER unit 289, eight extent start positions (extent start locations 264) and eight extent block numbers (numbers 265 of blocks) can be recorded. Therefore, by using one descriptor ER unit, it is possible to designate eight dispersed areas based on data of the extent start positions (extent start locations 264) and the extent block numbers (numbers 265 of blocks).

The hierarchical directory structure according to this embodiment of the present invention will be further described in detail with reference to FIG. 23. Since data of "FFFF" is registered at the head of the first ER unit 280, it is possible to determine that the first ER unit 280 is the index ER unit 280. In order to search for the first ER unit 281 forming the data of the file f9, data of "0000" may be retrieved in the logical offset 290. Then, a recorded data of the ER index 291 corresponding to the data "0000" of the logical offset 290 is "2", and hence it can be determined that the second ER unit 281 is the first ER unit forming the data of the file f9. Referring to the second ER unit (descriptor ER unit) 281, it is determined that an extent start position 292 of a first divided area of the file f9 is an allocation block number "0152" and an extent block number 293 is an allocation block number "0002". Similarly, in the descriptor ER unit 182, data concerning second to eighth divided areas are successively recorded.

In order to search for data succeeding the descriptor ER unit 281 which is the second ER unit, data "0001" next to the data "0000" of the logical offset 290 in the index ER unit 280 is retrieved. Since a recorded data of the ER index 291 corresponding to data "0001" of the logical offset 290 is "3", it means that a third ER unit (descriptor ER unit) 282 exists as data continuously succeeding the second ER unit 281. Referring to the third ER unit (descriptor ER unit) 282, allocation numbers "11991" and "2065" respectively indicative of extent start positions of ninth and tenth dispersed areas and allocation block numbers "0002" and "0002" indicative of data lengths are recorded.

As described above, since the respective allocation block positions of the ten dispersed areas are indicated by using the descriptor ER units 281, 282 of the extent record block ERB, even if the file is recorded on the dispersed areas, it is possible to grasp the respective positions of the dispersed areas in the management block having the extent record block ERB. Therefore, even when the respective dispersed areas are continuously read out as one file from the mini disk 25, it is unnecessary to retrieve the respective positions of the dispersed areas on the mini disk 25, which leads to a quick access to the mini disk.

While in this embodiment, in order to explain the hierarchical structure of the file, it is assumed that the high-resolution file f9 is recorded on the dispersed areas, practically, if an occupied area of the recorded picture files exceeds 90% of the whole area of the mini disk, there is the possibility that one picture file is inevitably recorded on dispersed areas.

[explanation of format of texture data in mini disk]

A texture data format of a mini disk will be described with reference to FIG. 24. The texture data recorded in accordance with the format of the texture data of the mini disk is record on the texture MD 26 shown in FIG. 1. The mini disk 26 on which the texture data of the respective resolutions are recorded has a new format used for recording the texture data which will be described later on.

The format of the texture data of the mini disk according to this embodiment utilizes the video data format for the mini disk described with reference to FIGS. 11 to 23. In particular, as shown in FIG. 24, the texture data format is used to designate areas where a plurality of texture data and key signal data are stored.

Figure 21:
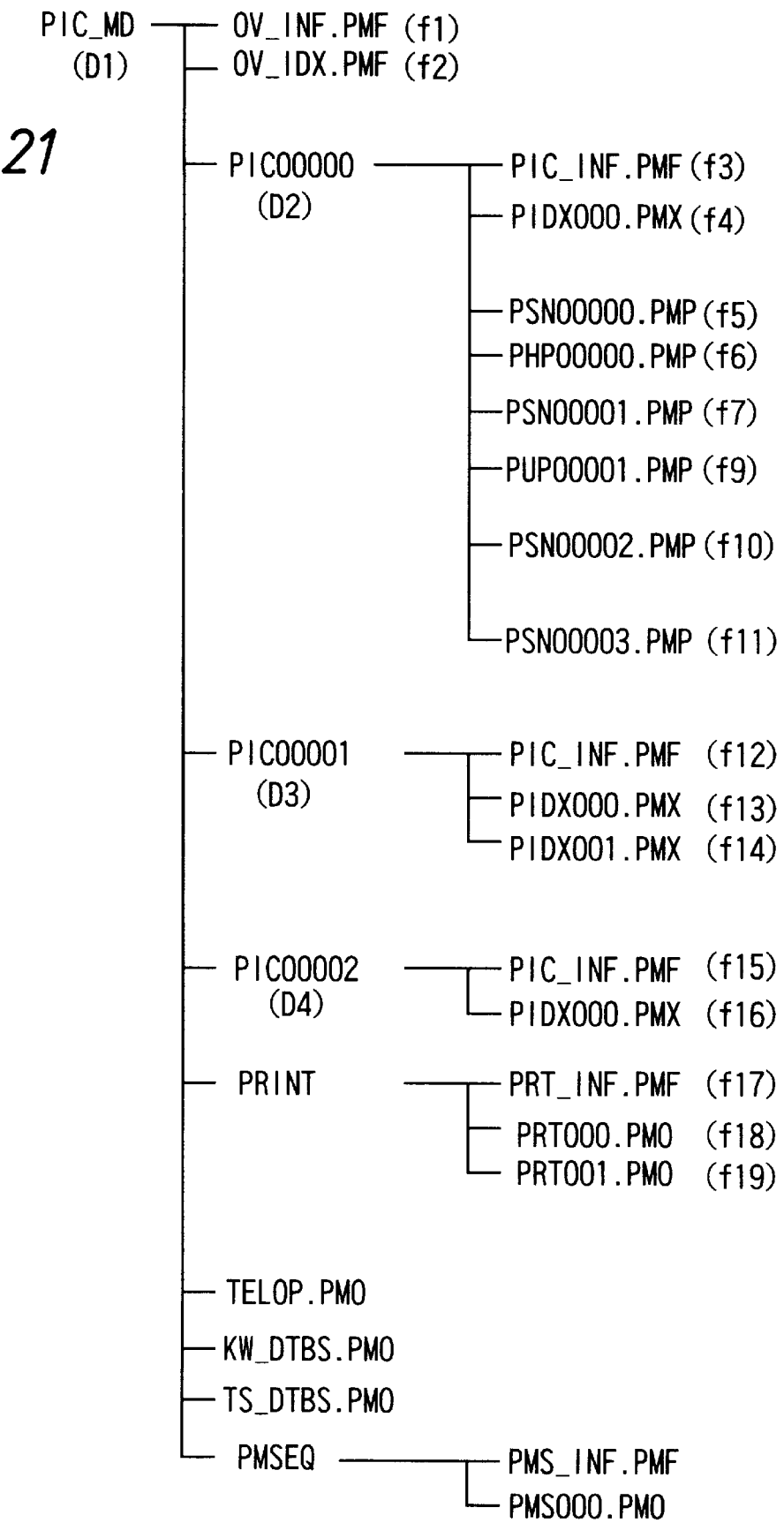
FIG. 21 is a diagram showing a hierarchical directory structure of the video data used in the picture synthesizing apparatus according to this embodiment.
Figure 22:
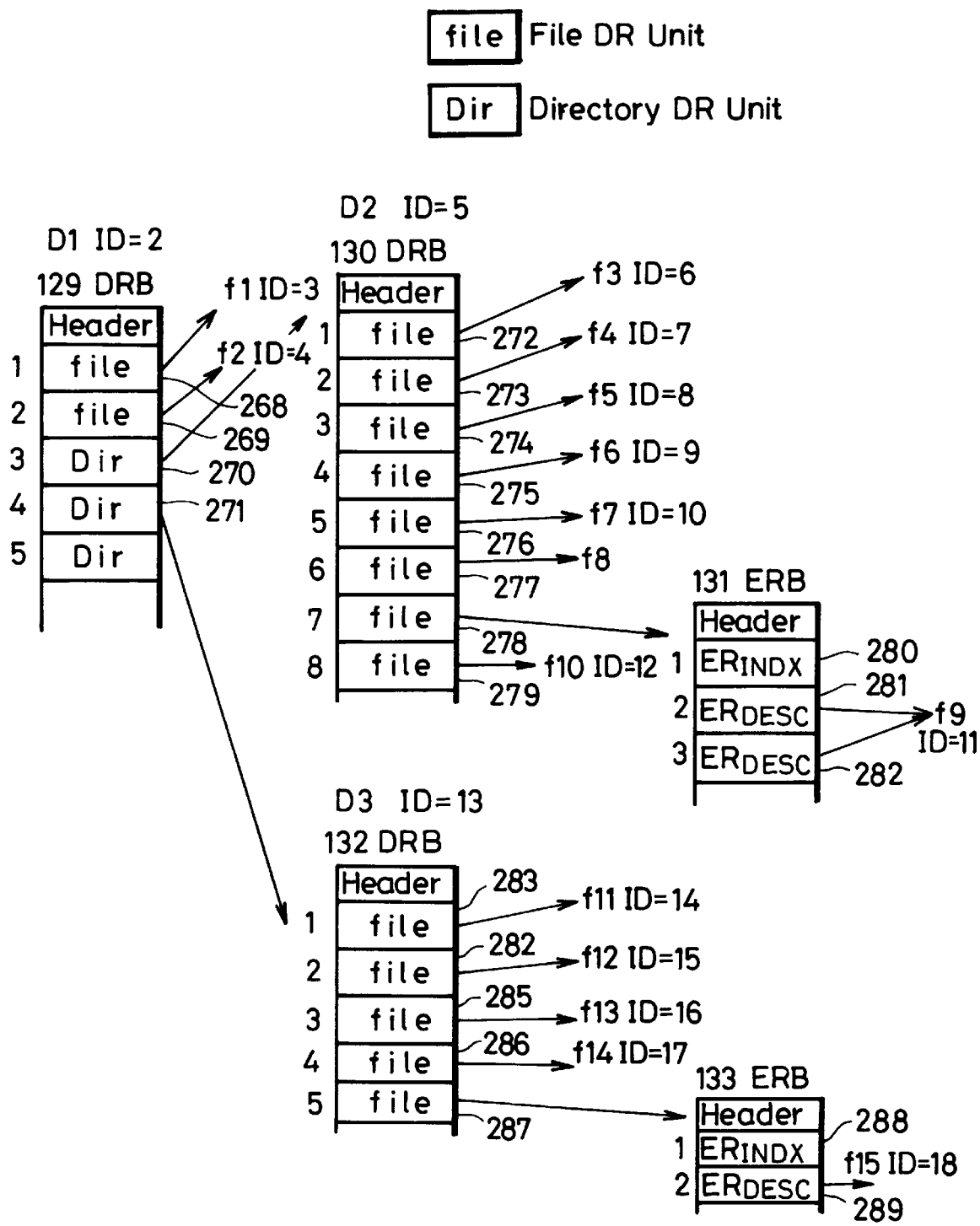
FIG. 22 is a diagram showing the directory record block DRB and the extent record block ERB forming the management block shown in FIGS. 12A to 12C.
Figure 24:
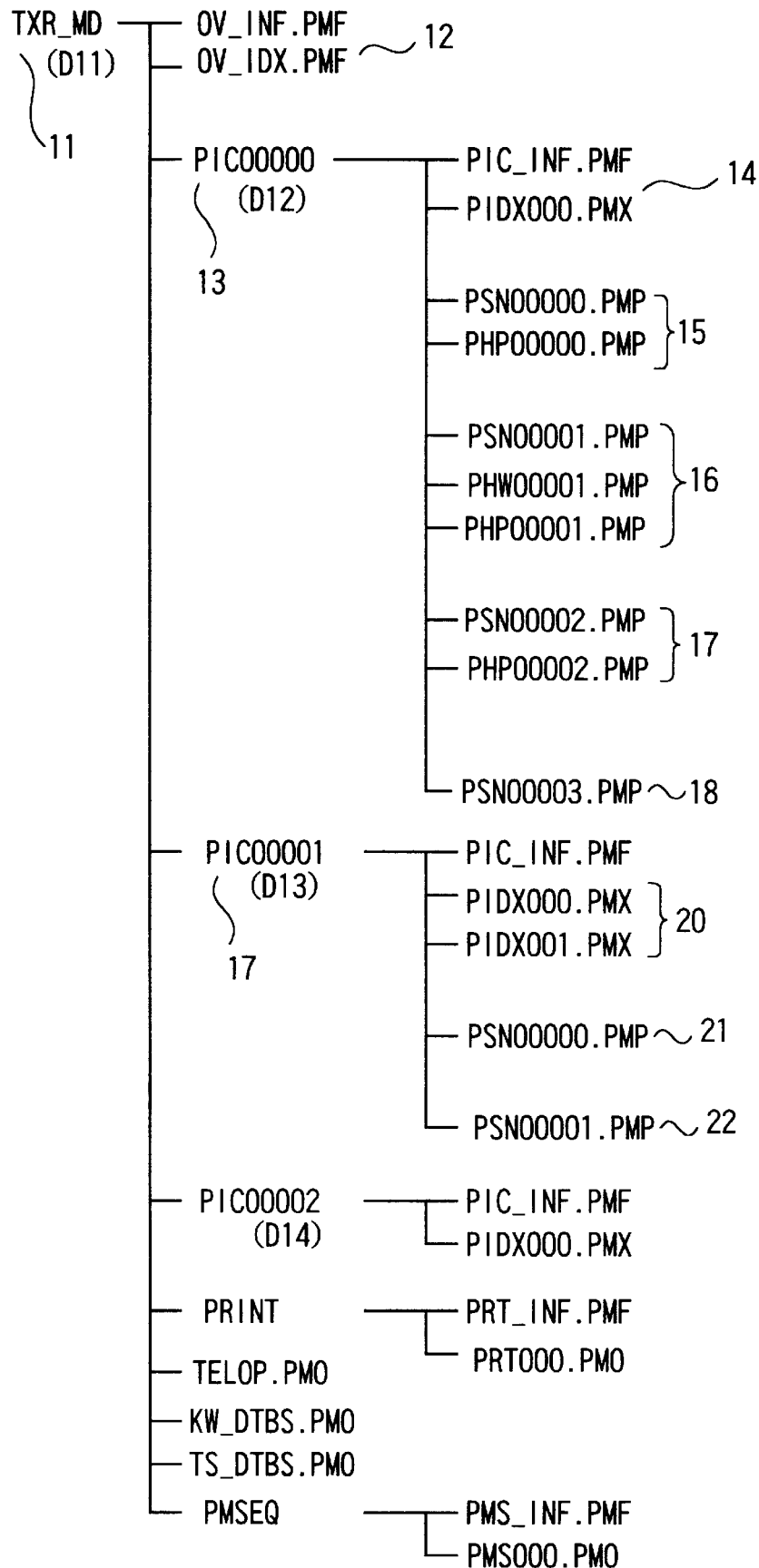
FIG. 24 is a diagram showing a hierarchical directory structure of a texture data used in the picture synthesizing apparatus according to this embodiment.

A hierarchical directory structure of the texture data shown in FIG. 24 corresponds to the hierarchical directory structure of the video data shown in FIG. 21. Other texture data formats for the mini disk are similar to the video data formats for the mini disk described with reference to FIGS. 11 to 23 other than FIG. 21. Therefore, the hierarchical directory structure of the texture data shown in FIG. 24 will hereinafter be described, and other formats of the texture data need not be described in detail.

[explanation of texture data file and file hierarchical structure]

A file and its hierarchical structure will be described with reference to FIG. 24. It is assumed that a directory in which a texture data used in the picture synthesizing apparatus of the still picture control apparatus is recorded is a directory D11 (TXR_MD). In the directory D11 (TXR_MD), a management file, a texture file, a texture index file and so on are recorded.

A filename extension of a management file is "PMF". By detecting a "PMF" extension, it is possible to identify that the file having the "PMF" file name extension is the management file. The management file includes an overall information management file (OV_INF.PMF), a texture data management file (PIC_INF.PMF), a print data management file (PRT_INF. PMF) a reproduction control management file (PMS_INF. PMF) and so on.

A filename extension of every texture file used for recording a texture data is "PMP". By detecting a "PMP" filename extension, it is possible to identify that the file having the "PMP" filename extension is the texture file. The texture file includes a high-resolution texture file for recording a high-resolution texture data HD and a middle-resolution texture file for recording a middle-resolution texture data SD.

The middle-resolution texture file includes a PSNnnnnn. PMP" file having a texture data of an aspect ratio of 4:3 and a size of 640 pixels×480 pixels and a "PSWnnnnn. PMP" file having a texture data of an aspect ratio of 16:9 and a size of 848 pixels×480 pixels.

The high-resolution texture file includes a "PHPnnnnn. PMP" file having a texture data of an aspect ratio of 3:2 and a size of 1536 pixels×1024 pixels and a "PHWnnnnn. PMP" file having a texture data of an aspect ratio of 16:9 and a size of 1920 pixels×1080 pixels. An ultrahigh-resolution texture file UD which is one of the high-resolution texture files includes a "PUPnnnnn. PMP" file having a texture data of an aspect ratio of 3:2 and a size of 3072 pixels×2048 pixels and a "PHWnnnnn. PMP" file having a texture data of an aspect ratio of 16:9 and a size of 1920 pixels×1080 pixels.

First three characters (e.g., PHP or the like) of a filename of the texture file having a "PMP" extension are determined depending upon a kind of the texture.

Especially, according to this embodiment, it is possible to determine whether a file is a texture data file or a key signal data file, by checking a texture number given to the texture file. Specifically, the texture numbers of different kinds are given to the texture data file and to the key signal data file, respectively. The texture number forms a picture-synthesis data number.

The picture synthesizing apparatus of the still picture control apparatus manages the texture data recorded on the mini disk 26 by using a hierarchical directory structure. As shown in FIG. 24, in the hierarchical directory structure, a directory D11 (TXR_MD which is a directory name) where the texture data are recorded is provided, and files are managed in the directory TXR_MD.

In the directory D11 (TXR_MD), an overall information management file (OV_INF. PMF) for managing the overall informations, an overall index file 12 (OV_IDX. PMX) for recording representative index files of respective albums, and texture directories D12 to D14 (PIC00000 to PIC00002) of the respective albums are provided.

The first directory 13 (D12) (PIC00000) and a second directory 19 (D13) (PIC00001) will hereinafter and specifically be described in detail.

In this embodiment, as the texture directories, the respective texture directories (PIC00000) to (PIC00002) having the directory numbers "00000" to "00002" are provided. Five characters succeeding "PIC" of the texture directory are given as a directory number in an order of generation of the texture directory. The textures which are as many as the number of the directories can be stored. The directory indicates a pair of texture data files and a key signal data file. The respective texture directories (PIC00000) to (PIC00002) form subdirectories of the directory D11 (TXR_MD).

The directory D11 (TXR_MD) also includes a print directory (PRINT) used for managing a print control data such as a printing tint, a print size, rotation or the like, a telop file (TELOP. PMO) used for managing telops such as a title of a picture displayed on a monitor or the like, a keyword retrieval file (KW_DTBS. PMO) used for retrieving a texture number of the respective textures and key words added to the respective textures, a time stamp file (TS_DTBS. PMO) used for managing recording date and time of a texture or the like, and a reproduction control directory (PMSEQ) used for managing a program reproduction such as reproduction of only designated textures.

In the second directory 13 (D12) (PIC00000), a texture data management file (PIC_INF. PMF) used for managing a plurality of texture files designated by the directory number "00000", and a texture index file 14 (PIDX000. PMX) including all the index textures in the texture directory 13 (D12) are recorded.

Particularly, in the second directory 13 (D12), a middle-resolution texture file (PSN00000. PMP) and a high-resolution picture file f6 (PHP00000. PMP) both of which are generated based on the texture data 15 designated by the texture number "00000" are recorded. Thus, the texture data file is stored in the file having the texture number "00000".

A middle-resolution key data file (PSN00001. PMP) and a high-resolution key data files (PHW00001. PMP) and (PHP00001. PMP) all of which are generated based on the key signal data 16 designated by the texture number "00001" are recorded. A middle-resolution key data file (PSN0002. PMP) and a high-resolution key data file (PHP00002. PMP) generated based on the key signal data 17 designated by the texture number "00002" are recorded. A middle-resolution key data file (PSN00003. PMP) generated based on the key signal data 18 designated by the texture number "00003" is recorded. Thus, the key data files are stored in the files designated by the texture numbers "00001" to "0000n" (where n is a natural number).

In a third directory 19 (D13) (PIC00001) designated by a directory number "00001", a texture data management file (PIC_INF. PMF) and two index files (PIDX000. PMX and PIDX001. PMX) for managing indexes of a texture and a key signal are recorded. The two texture index files are used to manage indexes corresponding to a texture file and a key data file recorded in the directory 19 (D13) (PIC00001). Formally, two index files are employed with being linked with each other.

In the third directory 19 (D13) (PIC00001), a middle-resolution texture data file (PSN00000. PMP) generated based on a texture data 21 designated by the texture number "00000" is recorded. Thus, the texture data file is stored in the file designated by the texture number "00000".

A middle-resolution key data file (PSN00001. PMP) generated based on a key signal data 22 designated by the texture number "00001" is recorded. Thus, the key data files are stored in the files designated by the texture numbers "00001" to "0000n" (where n is a natural number").

The file name 11 forms the directory. The first directory 13 and the second directory 19 form subdirectories. The texture data 15 and the texture data 21 form a picture-synthesis data file. The key signal data 16, the key signal data 17 and the key signal data 22 form the key data file.

In the print directory (PRINT), a print data management file (PRT_INF. PMF) used for managing a plurality of print data and print data files (PRT000. PMO and PRTnnn. PMO) managed by the print data management file are recorded.

In the reproduction control directory (PMSEQ), a reproduction control management file (PMS_INF. PMF) used for managing a reproduction control data file recorded in the reproduction control directory (PMSEQ) and a plurality of reproduction control data files (PMS000. PMO to PMSnnn. PMO) used for controlling a texture sequence are recorded.

As described above, the texture data file is stored in the file of the texture number "00000" corresponding to the picture number "00000" shown in FIG. 21 and the key data file is stored in the file of the texture number "0000n" corresponding to the picture number "0000n" shown in FIG. 21. Therefore, the format of the video data is utilized to define the texture number, and the files of the texture data and the key data are stored. As a result, when the texture data and the key data are synthesized with the video data, it is possible to simplify an arrangement of the software, to reduce processes of developing the software, and to reduce a time required for synthesizing the pictures.

According to the present invention, the picture synthesizing apparatus according to this embodiment includes a data reading means for reading a video data and a picture-synthesis data from a video data recording medium where the video data is recorded in accordance with a video data recording format having a hierarchical structure and a picture-synthesis data recording medium where the picture-synthesis data having a hierarchical structure similar to the hierarchical structure of the video data recording format is recorded, a video data storage means for storing the video data read out by the data reading means, a picture-synthesis data storage means for storing a picture-synthesis data used for picture synthesis read out by the data reading means, a key data storage means for storing a key signal data for picture synthesis, and a picture synthesizing means for synthesizing the video data and the picture-synthesis data by using data of the key signal. The synthesizing means clips out the video data by using the data of the key signal to synthesize the clipped video data with the picture-synthesis data. Therefore, since it becomes easy to read out the picture-synthesis data and the key signal data, there can be achieved the effect in which it is possible to synthesize the video data and the picture-synthesis data with a simple arrangement.

According to the picture synthesizing apparatus of the present invention, in the video data recording format having the hierarchical structure, a directory contains a plurality of subdirectories in its lower stage and each of the subdirectories contains a plurality of video data files in its lower stage, and in the picture-synthesis data recording format having the hierarchical structure, a directory indicative of a file of the picture-synthesis data contains a plurality of subdirectories and each of the subdirectories in its lower stage contains a plurality of picture-synthesis data files and a plurality of key signal data files in its lower stage. Therefore, since the picture-synthesis data and the key signal data can be read easily by reading the picture-synthesis data and the key signal data in the subdirectory required for the picture synthesis, there can be achieved the effect it is possible to synthesize the video data and the picture-synthesis data with a simple arrangement.

According to the present invention, a recording medium includes a video data recording medium where a video data is recorded in accordance with a video data recording format having a hierarchical structure and a picture-synthesis data recording medium where a picture-synthesis data having a hierarchical structure similar to the hierarchical structure of the video data recording format is recorded. Therefore, it is possible to simplify the operation of reading the picture-synthesis data and the key signal data. When the picture-synthesis data and the key data are synthesized with the video data, it is possible to simplify an arrangement of the software, to reduce processes of developing the software, and to reduce a time required for synthesizing the pictures.

According to a recording medium of the present invention, in the video data recording format having the hierarchical structure, a directory contains a plurality of subdirectories in its lower stage and each of the subdirectories contains a plurality of video data files in its lower stage, and in the picture-synthesis data recording format having the hierarchical structure, a directory indicative of a file of the picture-synthesis data contains a plurality of subdirectories in its lower stage and each of the subdirectories contains a plurality of picture-synthesis data files and a plurality of key signal data files in its lower stage. Therefore, the format of the video data is utilized to define the texture number, and the files of the picture-synthesis data and the key data are stored. As a result, when the picture-synthesis data and the key data are synthesized with the video data, it is possible to simplify an arrangement of the software, to reduce processes of developing the software, and to reduce a time required for synthesizing the pictures.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An apparatus for synthesizing source pictures stored in a recording medium, comprising:

first reproducing means for reproducing a video data from a first recording medium in which said video data is recorded in accordance with a data recording format having a hierarchical structure, said video data comprising at least a high resolution video data and a corresponding low resolution video data, second reproducing means for reproducing a texture image data and a key data for keying said reproduced video data from a second recording medium in which said texture image data and said key data are recorded in accordance with the same recording format as said data recording format wherein said texture image data comprises at least a high resolution texture image data and an associated low resolution texture image data, and wherein said key data comprises at least a high resolution key data and an associated low resolution key data; and synthesizing means for synthesizing said high resolution video data and said high resolution texture image data based on said high resolution key data and for synthesizing said low resolution video data and said low resolution texture image data based on said low resolution key data.

2. The synthesizing apparatus according to claim 1, wherein each of said first recording medium and said second recording medium has a first management information used for managing a write-protected area and a rewritable area provided on said recording medium, a first area provided in said rewritable area managed by said first management information and used to record high and low resolution video data, texture data and key data therein and a management file for managing correspondence informations among said plurality of picture files, and a second area provided in said rewritable area other than said first area managed by said first management information and used to record therein a second management information used for managing a relative position in said first area of each of files recorded in said first area by a predetermined recording unit of said recording medium.

3. The synthesizing apparatus according to claim 2, wherein said first area in each of said first recording medium and said second recording medium is formed of a hierarchical structure formed of a directory and a subdirectory made within said directory.

4. The synthesizing apparatus according to claim 3, wherein in said first management file a directory information used for managing all subdirectories of said subdirectory made within said directory is recorded, and wherein in said second management file a second file information used for managing a data file recorded in said subdirectory is recorded.

5. The synthesizing apparatus according to claim 4, wherein said first area of said recording medium has a hierarchical directory structure formed of a directory and a subdirectory made within said directory, and wherein said index file is formed of a first index file recorded in said directory and a second index file recorded in said subdirectory.

6. The synthesizing apparatus according to claim 5, wherein said first area of said recording medium has a hierarchical directory structure formed of a directory and a subdirectory made within said directory, wherein said management file includes a first management file where a directory information used for managing all subdirectories of said subdirectory made within said directory is recorded and a second file management file where a second file information used for managing a data file recorded in said subdirectory is recorded, wherein said index file includes a first index file used for recording an index picture indicating at least one data file in data files recorded in said subdirectory made within said directory and a second index file used for recording an index data indicating all data files recorded in said subdirectory, and wherein in said directory said first management file and said first index file are recorded and in said subdirectory said second management file and said second index file are recorded.

7. The synthesizing apparatus according to claim 1, wherein said reproducing means manages said rewritable area and said write-protected area on said recording media based on first management informations recorded on said first and second recording media, manages a plurality of data files obtained by recording high and low resolution video data in said first area provided in said rewritable area by using a management file where corresponding states among said corresponding high and low resolution video data are recorded, manages, in a second area which is said rewritable area other than said first area, recorded states in said second area at a management block unit by a second management information recorded in said second area, and manages recorded states of said first area of said picture file and said management file recorded in said first area by a predetermined recording unit of said recording medium.

8. The synthesizing apparatus according to claim 1, wherein each of said first and second recording media has a plurality of picture files obtained by recording high and low resolution video data, a management file used for managing correspondence informations among said plurality of picture files, and a management information for managing relative position on said recording media of said management file and said picture files by a predetermined recording unit of said recording media, and wherein said reproducing means designates a desired picture file from said picture files of said high and low resolution video data based on a management data of said management file and designates a position in said recording medium of said picture file designated by said management file based on said management data of said management information.

9. The synthesizing apparatus according to claim 1, wherein each of said first and second recording media has a first area used to record therein a plurality of picture files including high and low resolution video data and a management file used for managing correspondence informations among said plurality of picture files, and a second area different from said first area used to record a management information table for managing relative positions in said first area of respective files recorded in said first area by a predetermined recording unit of said recording media, and wherein said reproducing means designates said picture file based on a data of a management file recorded in said first area and reproduces a file recorded in said recording media based on a data of said management information table recorded in said second area.

10. She synthesizing apparatus according to claim 9, wherein said reproducing means, based on a data of said management file and said management information table stored in said first area, reproduces a high-resolution video data from a high-resolution video data file recorded on said recording medium, and reproduces a low-resolution video data from a low resolution video data file recorded on said recording medium.

11. The synthesizing apparatus according to claim 10, wherein in said recording medium said high-resolution picture file having a high-resolution video data that is fixed-length-coded so as to have a first data length, and a low resolution video data file having a plurality of low-resolution video data that is fixed-length-coded so as to have a second data length shorter than said first data length are recorded, wherein said reproducing means, based on data of said management file and said management information table, reproduces said high-resolution video data obtained by fixed-length-coding said high-resolution picture file, and said low-resolution video data obtained by fixed-length-coding said index files, and decodes and outputs said reproduced v ide o data of respective resolutions.

12. The synthesizing apparatus according to claim 11, wherein said first area of said recording medium has a hierarchical directory structure formed of a directory and a subdirectory made within said directory, and said management file has a first management file recorded in said directory and a second management file recorded in said subdirectory, and wherein said reproducing means has a first index file recorded in said directory and a second index file recorded in said subdirectory, reproduces, based on said first management file data and said management information table data, a low-resolution video data of said first index file and, based on said second management file data and said management information table data, reproduces said low-resolution video data of said second index file.

13. The synthesizing apparatus according to claim 12, wherein in said first management file recorded is a directory information used for managing all subdirectories of said subdirectory made within said directory and in said second management file recorded is a picture file information used for managing all picture files recorded in said subdirectory, and wherein said reproducing means designates a directory based on said directory information of said first management file and reproduces a picture file based on said file information of said second management file recorded in said designated directory.

14. The synthesizing apparatus according to claim 13, wherein in said first index file recorded is a low-resolution video data indicative of at least one picture file in picture files recorded in said respective subdirectories made within said directory, wherein in said second index file recorded is a low-resolution video data indicative all high-resolution picture files or middle-resolution picture files recorded in said subdirectory, and wherein said reproducing means simultaneously outputs low-resolution video data of respective subdirectories of all subdirectories made within said directory based on reproduction of said first index file and simultaneously outputs all the low-resolution video data recorded in said subdirectory based on reproduction of said second index file.

15. The synthesizing apparatus according to claim 10, where in said management file includes a first management file where a directory information for managing all subdirectories of said subdirectory made within said directory is recorded and a second management file where a second file information for managing a picture file recorded in said subdirectory is recorded, wherein said index file includes a first index file for recording an index picture indicative of at least one picture file in picture files recorded in said subdirectory made within said directory and a second index file for recording an index picture indicative all picture files recorded in said subdirectory, and wherein said reproducing means reproduces low-resolution video data of said first index file based on data of said first management file and data of said management information table and reproduces low-resolution video data of said second index file based on data of said second management file and data of said management information table.

16. The synthesizing apparatus according to claim 15, wherein in said first management file a directory where said low-resolution video data are recorded and a directory information unit indicative of numbers of high-resolution picture files or middle-resolution picture files corresponding to said low-resolution video data are recorded so as to correspond to an order of said low-resolution video data recorded in said first index file, and in said second management file a high-resolution picture file corresponding to said low-resolution video data or a video information unit for indicating a number of a middle-resolution picture file is recorded so as to correspond to an order of said low-resolution video data recorded in said second index file, and wherein said reproducing means designates a subdirectory based on data of said directory information unit recorded in said first management file and reproduces a high-resolution picture file or a middle-resolution picture file based on a picture information unit recorded in said management file in said subdirectory.

17. The synthesizing apparatus according to claim 16, wherein said management information table provided in said second area of said recording medium includes a first management block (MT) for managing said second area by using a management block unit different from said predetermined recording unit of said recording medium, a second management block (VSB) for managing a recorded state of said first area by said predetermined recording unit, and a third management block (DRB) for managing data concerning respective files and directories stored in said first area, and wherein said picture file is reproduced based on data of said first management block, said second management block and said third management block stored in said first storing means.

18. The synthesizing apparatus according to claim 17, wherein said picture file is formed of a high-resolution picture file where a high-resolution video data coded so as to have a first data length is recorded, a middle-resolution picture file where a middle-resolution video data coded so as to have a second data length is recorded, and a low-index file where a low-resolution video data coded so as to have a third data length is recorded, a nd wherein said reproducing means designates said high-resolution picture file or said middle-resolution picture file based on said management file stored in said first storage means, designates a third block corresponding to said subdirectory where said designated high-resolution picture file and said designated middle-resolution picture file are recorded based on data of said designated third block, designates s aid high-resolution video file and said middle-resolution picture file based on data of said designated third block, and reproduces a high-resolution video data and a middle-resolution video data from said high-resolution picture file and said middle-resolution picture file, respectively, based on data recorded on said management file.

19. The synthesizing apparatus according to claim 18, wherein said management file has a first management file recorded in said directory and a second management file recorded in said subdirectory, said index file has a first index file recorded in said directory and a second index file recorded in said subdirectory, a directory where a low-resolution video data recorded in said first index file is recorded and a plurality of directory information units indicative of numbers of high-resolution picture file or middle-resolution picture file corresponding to said low-resolution picture file are recorded in said first management file so as to correspond to an order of said low-resolution video data recorded in said first index file, and a picture information unit indicative of numbers of high-resolution picture files or middle-resolution picture files corresponding to a low-resolution video data recorded in said second index file is recorded in said second management file so as to correspond to an order of said low-resolution video data, and wherein said reproducing means designates a subdirectory in an order of reproduction of said low-resolution video data of said first index file based on a data of said directory information unit recorded in said first management file, designates the high-resolution picture file or the middle-resolution picture file in an order of reproduction of the low-resolution video data of said second index file based on the picture information unit recorded in aid second management file in said subdirectory, designates a third block corresponding to said subdirectory where said designated high-resolution picture file and said designated middle-resolution picture file are recorded based on data of a first management block, designates said high-resolution picture file and said middle-resolution picture file based on data of said designated third block, and reproduces high-resolution video data and middle-resolution video data from said high-resolution picture file and said middle-resolution picture file based on data of said second management file recorded on said management file.

* * * * *